United States Patent
Arndt et al.

(10) Patent No.: US 7,260,664 B2
(45) Date of Patent: Aug. 21, 2007

(54) INTERRUPT MECHANISM ON AN IO ADAPTER THAT SUPPORTS VIRTUALIZATION

(75) Inventors: Richard Louis Arndt, Austin, TX (US); Giora Biran, Zichron-Yaakov (IL); Vadim Makhervaks, Austin, TX (US); Renato John Recio, Austin, TX (US); Leah Shalev, Zichron-Yaakov (IL); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 11/065,951

(22) Filed: Feb. 25, 2005

(65) Prior Publication Data

US 2006/0195644 A1    Aug. 31, 2006

(51) Int. Cl.
*G06F 13/24*    (2006.01)
(52) U.S. Cl. ................ 710/266; 710/306; 710/313
(58) Field of Classification Search ............. 710/22, 710/23, 26–28, 306, 312–315, 260, 263, 710/266–269; 711/153
See application file for complete search history.

(56) References Cited

U.S. PATENT DOCUMENTS

| | | | |
|---|---|---|---|
| 6,111,894 A | | 8/2000 | Bender et al. |
| 6,629,162 B1 | * | 9/2003 | Arndt et al. .................. 710/28 |
| 6,665,759 B2 | * | 12/2003 | Dawkins et al. ............ 710/200 |
| 6,880,021 B2 | * | 4/2005 | Easton et al. .................. 710/5 |
| 6,973,510 B2 | * | 12/2005 | Arndt et al. .................. 710/36 |
| 7,080,291 B2 | * | 7/2006 | Moriki et al. .................. 714/53 |
| 2002/0129172 A1 | * | 9/2002 | Baskey et al. ............... 709/310 |
| 2003/0014738 A1 | * | 1/2003 | Dawkins et al. ............ 717/131 |
| 2003/0110205 A1 | * | 6/2003 | Johnson ....................... 709/104 |

(Continued)

FOREIGN PATENT DOCUMENTS

EP    1508855 A2    8/2004

OTHER PUBLICATIONS

Dynamic Reconfiguration: Basic Building Blocks For Autonomic Computing On IBM Pseries Servers, IBM System Journal, vol. 42, Jan. 2003.*

(Continued)

*Primary Examiner*—Khanh Dang
(74) *Attorney, Agent, or Firm*—Duke W. Yee; Diana R. Gerhardt; Gerald H. Glanzman

(57) ABSTRACT

A mechanism for handling event notifications or interrupts in a logically partitioned computing system having IO adapters that support adapter virtualization are provided. A virtual adapter associated with a physical IO adapter detects an event, identifies a logical partition associated with the event, and writes an event notification entry in a partition interrupt control block (PICB) of the logical partition memory space. The virtual adapter notifies shared control point logic on the physical IO adapter of the update to the PICB which may then write an entry to a logical partition manager interrupt control block (LPAR manager ICB) identifying the update to the PICB and the operating system associated with the PICB. The LPAR manager may then inform the operating system of the logical partition of the updates to the PICB which may then read the entries in the PICB, process them and inform appropriate application instances of the events.

21 Claims, 13 Drawing Sheets

U.S. PATENT DOCUMENTS

2003/0204648 A1* 10/2003 Arndt .......................... 710/5
2005/0097384 A1* 5/2005 Uehara et al. ................ 714/1
2005/0102682 A1 5/2005 Shah et al.

OTHER PUBLICATIONS

Logical Partition Security in the IBM @ server pSeries 690, IBM, May 15, 2002.*
The Effect of Virtualization on OS Interference, Eric Van Hensbergen, IBM Research.*
U.S. Appl. No. 11/066,424, filed Feb. 25, 2005, Arndt et al.
U.S. Appl. No. 11/066,645, filed Feb. 25, 2005, Arndt et al.
U.S. Appl. No. 11/065,869, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/066,419, filed Feb. 25, 2005, Arndt et al.
U.S. Appl. No. 11/066,931, filed Feb. 25, 2005, Arndt et al.
U.S. Appl. No. 11/068,664, filed Feb. 28, 2005, Arndt et al.
U.S. Appl. No. 11/066,353, filed Feb. 25, 2005, Arndt et al.
U.S. Appl. No. 11/065,830, filed Feb. 25, 2005, Arndt et al.
U.S. Appl. No. 11/065,829, filed Feb. 25, 2005, Arndt et al.
U.S. Appl. No. 11/066,517, filed Feb. 25, 2005, Arndt et al.
U.S. Appl. No. 11/065,821, filed Feb. 25, 2005, Arndt et al.
U.S. Appl. No. 11/066,487, filed Feb. 25, 2005, Arndt et al.
U.S. Appl. No. 11/066,519, filed Feb. 25, 2005, Arndt et al.
U.S. Appl. No. 11/066,521, filed Feb. 25, 2005, Arndt et al.
U.S. Appl. No. 11/067,354, filed Feb. 25, 2005, Arndt et al.
U.S. Appl. No. 11/066,590, filed Feb. 25, 2005, Arndt et al.
U.S. Appl. No. 11/065,823, filed Feb. 25, 2005, Arndt et al.
"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

* cited by examiner

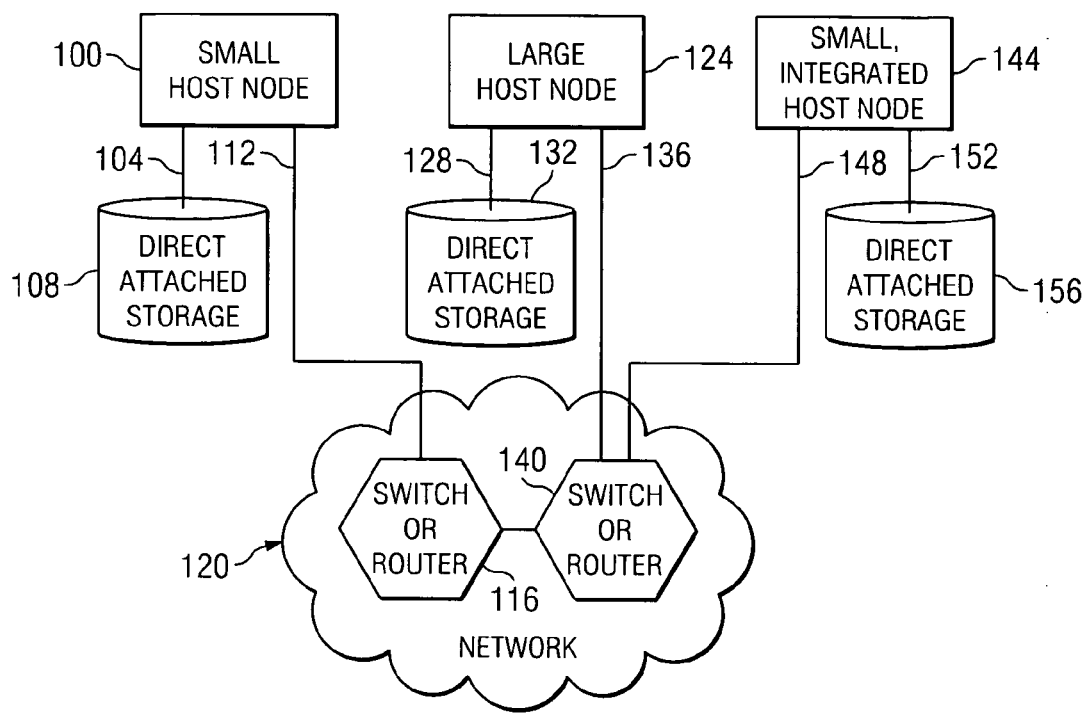
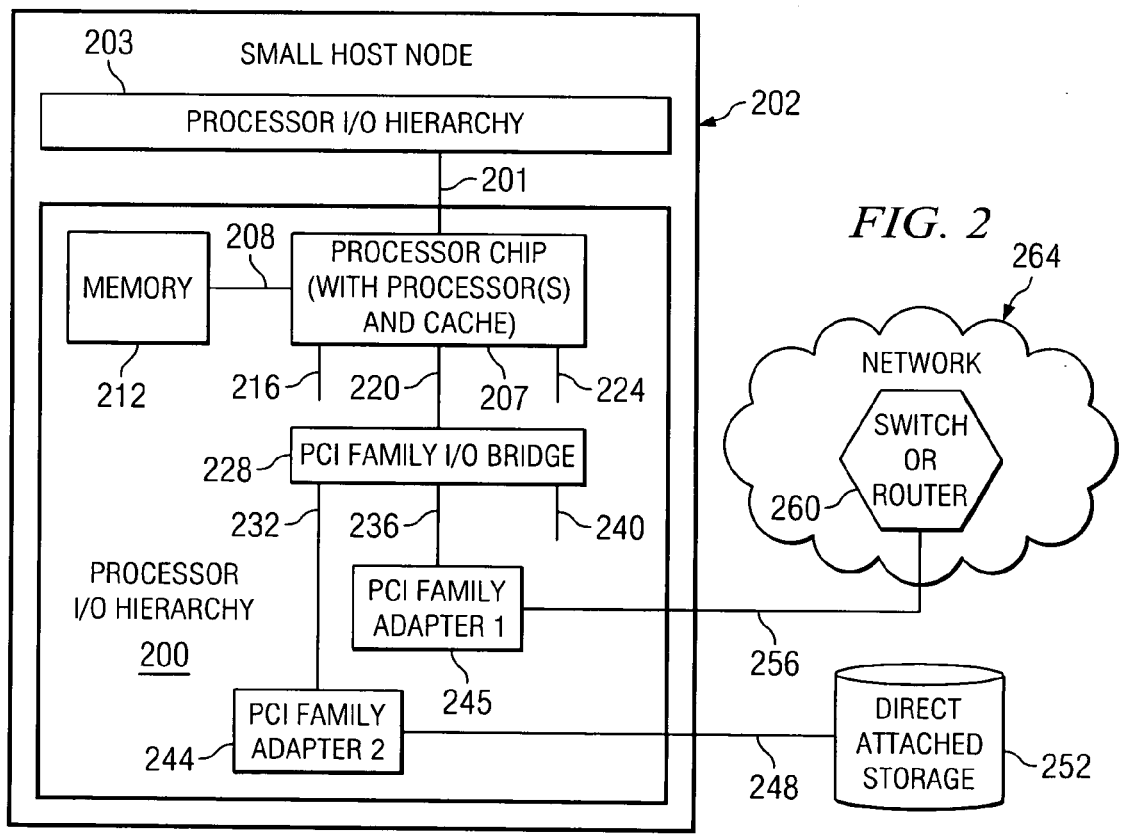

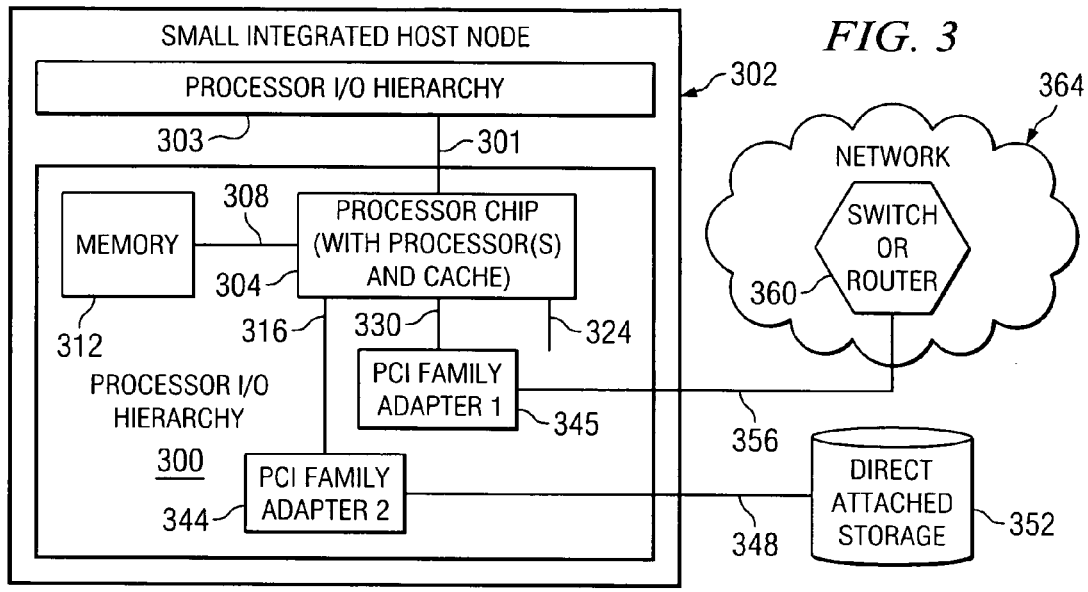
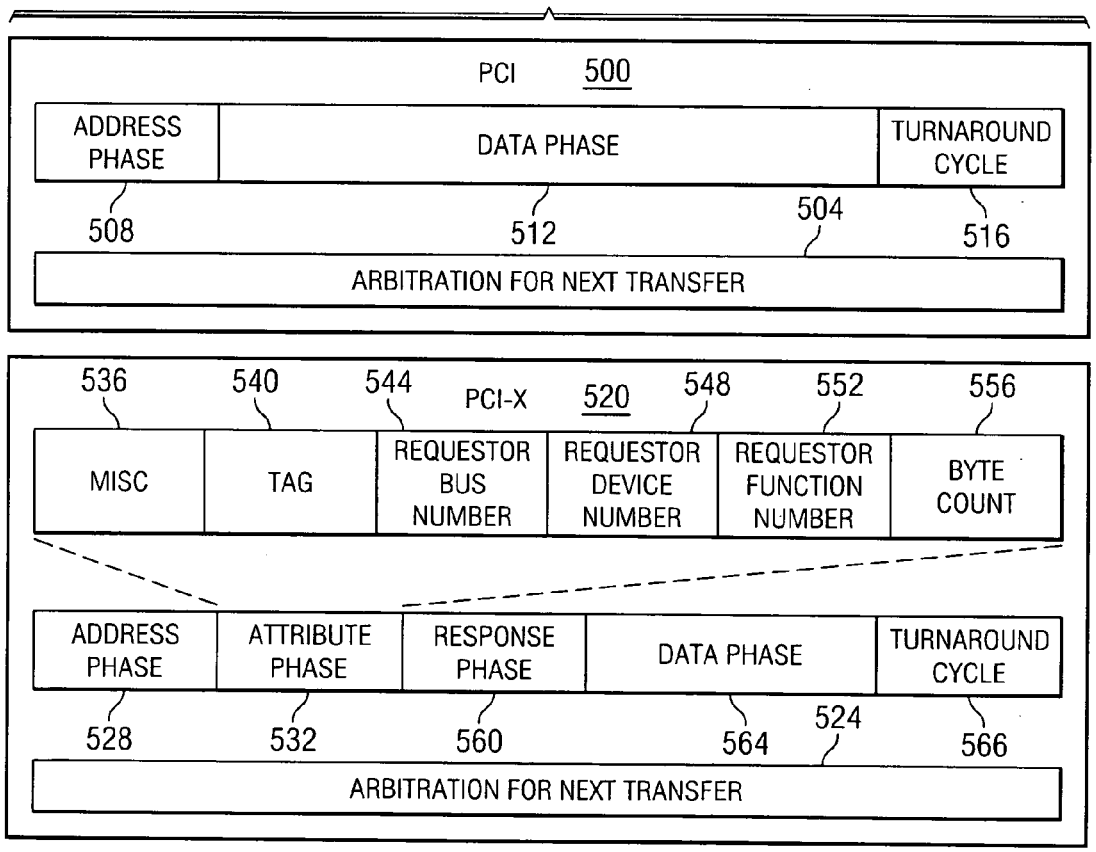

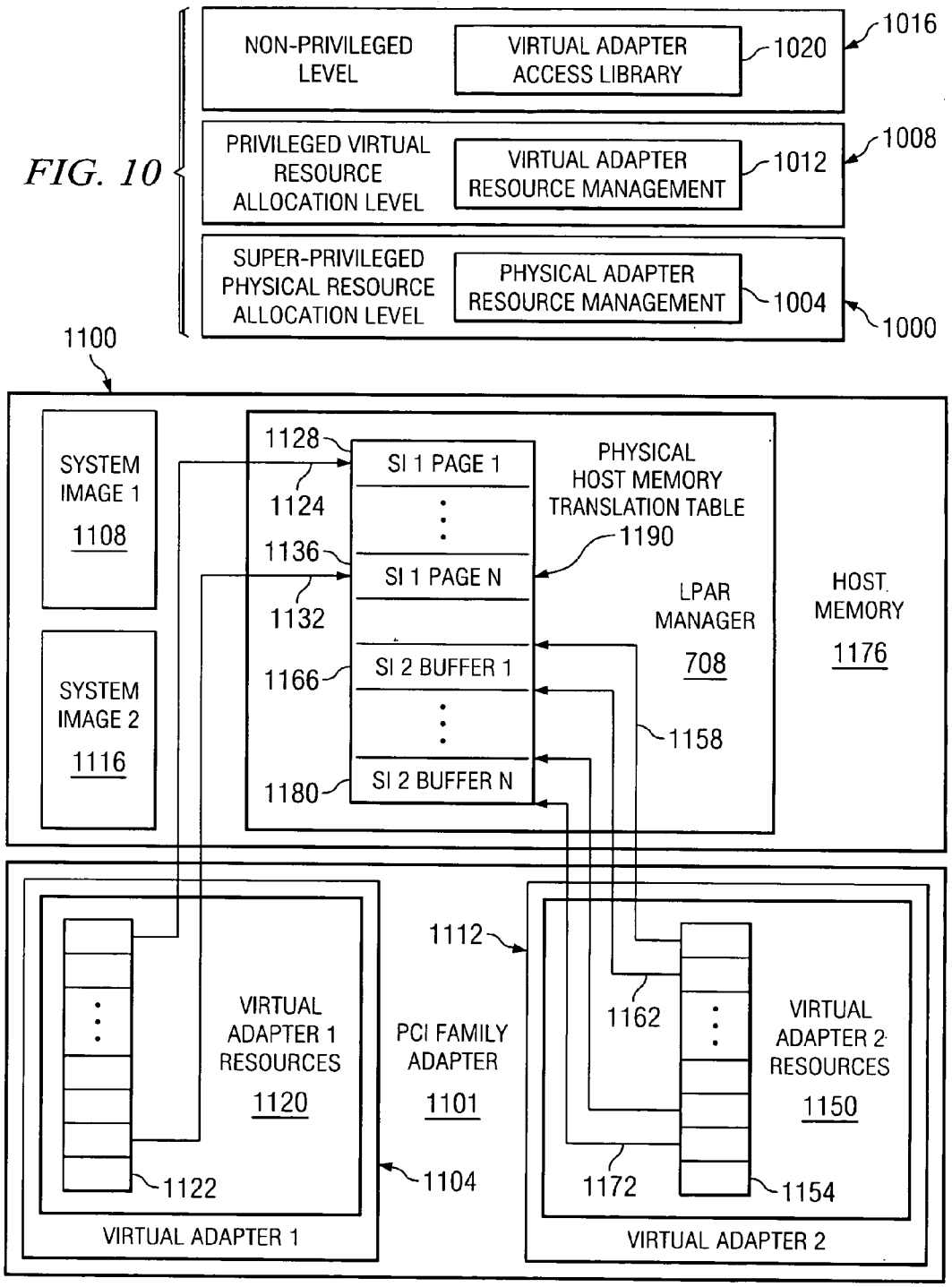

INTERRUPT MECHANISM ON AN IO ADAPTER THAT SUPPORTS VIRTUALIZATION

CROSS-REFERENCE TO RELATED APPLICATIONS

This application is related to commonly assigned and co-pending U.S. patent application Ser. No. 11/066,424, filed Feb. 25, 2005 and entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645, filed Feb. 25, 2005 and entitled "Virtualized I/O Adapter for a Multi-Processor Data Processing System"; U.S. patent application Ser. No. 11/065,869, filed Feb. 25, 2005 and entitled "Virtualized Fibre Channel Adapter for a Multi-Processor Data Processing System"; U.S. patent application Ser. No. 11/066,201, filed Feb. 25, 2005 and entitled "System and Method for Modification of Virtual Adapter Resources in a Logically Partitioned Data Processing System"; U.S. patent application Ser. No. 11/065,818, filed Feb. 25, 2005 and entitled "Method, System, and Computer Program Product for Virtual Adapter Destruction on a Physical Adapter that Supports Virtual Adapters"; U.S. patent application Ser. No. 11/066,518, filed Feb. 25, 2005 and entitled "System and Method of Virtual Resource Modification on a Physical Adapter that Supports Virtual Resources"; U.S. patent application Ser. No. 11/066,096, filed Feb. 25, 2005 and entitled "System and Method for Destroying Virtual Resources in a Logically Partitioned Data Processing System"; U.S. patent application Ser. No. 11/066,419, filed Feb. 25, 2005 and entitled "Association of Memory Access Through Protection Attributes that are Associated to an Access Control Level on a PCI Adapter that Supports Virtualization"; U.S. patent application Ser. No. 11/066,931, filed Feb. 25, 2005 and entitled "Association of Host Translations that are Associated to an Access Control Level on a PCI Bridge that Supports Virtualization"; U.S. patent application Ser. No. 11/065,823, filed Feb. 25, 2005 and entitled "Method, Apparatus, and Computer Program Product for Coordinating Error Reporting and Reset Utilizing an I/O Adapter that Supports Virtualization"; U.S. patent application Ser. No. 11/068,664, filed Feb. 28, 2005 and entitled "Method and System for Fully Trusted Adapter Validation of Addresses Referenced in a Virtual Host Transfer Request"; U.S. patent application Ser. No. 11/066,353, filed Feb. 25, 2005 and entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830, filed Feb. 25, 2005 and entitled "System and Method for Host Initialization for an Adapter that Supports Virtualization"; U.S. patent application Ser. No. 11/065,829, filed Feb. 25, 2005 and entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517, filed Feb. 25, 2005 and entitled "System and Method for Virtual Resource Initialization on a Physical Adapter that Supports Virtual Resources"; U.S. patent application Ser. No. 11/065,821, filed Feb. 25, 2005 and entitled "Method and System for Native Virtualization on a Partially Trusted Adapter Using Adapter Bus, Device and Function Number for Identification"; U.S. patent application Ser. No. 11/066,487, filed Feb. 25, 2005 and entitled "Native Virtualization on a Partially Trusted Adapter Using PCI Host Memory Mapped Input/Output Memory Address for Identification"; U.S. patent application Ser. No. 11/066,519, filed Feb. 25, 2005 and entitled "Native Virtualization on a Partially Trusted Adapter Using PCI Host Bus, Device, and Function Number for Identification; U.S. patent application Ser. No. 11/066,521, filed Feb. 25, 2005 and entitled "System and Method for Virtual Adapter Resource Allocation"; U.S. patent application Ser. No. 11/067,354, filed Feb. 25, 2005 and entitled "System and Method for Providing Quality of Service in a Virtual Adapter"; and U.S. patent application Ser. No. 11/066,590, filed Feb. 25, 2005 and entitled "System and Method for Managing Metrics Table Per Virtual Port in a Logically Partitioned Data Processing System" all of which are hereby incorporated by reference.

BACKGROUND OF THE INVENTION

1. Technical Field

The present invention relates generally to handling interrupts in a computer system, and more particularly to increasing interrupt handling efficiency in a logically partitioned computer system having an IO adapter that supports adapter virtualization.

2. Description of Related Art

An input/output (IO) adapter needs to notify applications when events that require the attention of the applications occur. For example, when a data packet is transmitted or received, completion of the processing of that data packet by the IO adapter needs to be communicated to the appropriate application, i.e. either the application from which the data packet was sent (outbound) or the application to which the data packet is destined (inbound). In addition, the IO adapter notifies the appropriate application(s) when error events occur. The error events are rare compared to the high rate of events caused by the normal flow of data packets through the IO adapter. The rate of events occurring scales with the speed of the network.

The notification of events to applications is performed primarily through the use of interrupts that are sent to the operating system. When an event occurs that requires notification to an application, an interrupt is generated by the IO adapter and sent to the operating system. An interrupt handler associated with the operating system performs appropriate processing on the interrupt to determine how to handle the occurrence of the event. Interrupts and interrupt handling are generally known in the art.

High speed IO adapters can cause a high rate of interrupts toward the operating system. As mentioned above, as the speed of the network increases, so does the number of events that occur and thus, the number of interrupts. The problem is that interrupt handling can be very expensive in terms of processor performance. That is, processor resources are utilized to handle the interrupts thereby reducing the processor's ability to do other work. Another problem associated with the notification of events from IO adapters is that for IO adapters that serve multiple applications, it is necessary to recognize the source of the interrupt in order to call the associated application.

These problems are made even more evident when the IO adapter is associated with a logically partitioned host system. Since each logical partition may have its own set of applications, its own operating system, memory resources, etc., the problems of large numbers of interrupts and identifying the appropriate application for a particular interrupt is made more complex.

Thus, it would be beneficial to have an improved system and method for handling interrupts in a logically partitioned environment. Moreover, it would be beneficial to have an improved system and method for handling interrupts in which the number of interrupt notifications is reduced and identification of associated applications is made less complex.

SUMMARY OF THE INVENTION

The present invention provides a system and method for handling event notifications or interrupts in a logically partitioned computing system having input/output (IO) adapters that support adapter virtualization. With the system and method of the present invention, a virtual adapter associated with a physical IO adapter detects an event for which an event notification or interrupt is to be generated and sent to an application instance. The virtual adapter identifies a logical partition associated with the event and writes an event notification entry in a partition interrupt control block (PICB) of the logical partition memory space. The virtual adapter then notifies shared control point logic on the physical IO adapter of the update to the PICB.

The shared control point logic may then write an entry to a logical partition manager interrupt control block (LPAR manager ICB) identifying the update to the PICB and the operating system associated with the PICB. The shared control point may also send an interrupt to the LPAR manager informing the LPAR manager of the update to the LPAR manager ICB. The LPAR manager may then inform the operating system of the logical partition associated with the event that there are new event notifications in the PICB that need to be processed. The operating system may then read the entries in the PICB, process them and inform appropriate application instances associated with the logical partition of the events. Once processing of these event notifications is complete, the operating system writes to the virtual adapter resources associated with the virtual adapter that originated the event notification informing the virtual adapter of the completion of processing of the PICB entry.

Event notifications/interrupts may be coalesced in a number of places in the above-described architecture. First, event notifications/interrupts may be coalesced in a buffer of the virtual adapter until a predetermined criteria is met at which time the event notifications/interrupts may be written to the PICB of the logical partition. Second, updates to the PICB may be coalesced in the PICB with the shared control point logic writing updates to the LPAR manager ICB only when a predetermined criteria has been met. Third, the LPAR manager may inform the operating system of the logical partition of the updates to the PICB only when predetermined criteria have been met.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary diagram of a distributed computer system in which exemplary aspects of the present invention may be implemented;

FIG. 2 is an exemplary functional block diagram of a small host processor node in accordance with an exemplary embodiment of the present invention;

FIG. 3 is an exemplary functional block diagram of a small, integrated host processor node in accordance with an exemplary embodiment of the present invention;

FIG. 5 is an exemplary diagram illustrating elements of a parallel Peripheral Computer Interface (PCI) bus protocol in accordance with an exemplary embodiment of the present invention;

FIG. 10 is an exemplary diagram illustrating a process for creation of three access control levels used to manage a PCI family adapter that supports I/O Virtualization in accordance with an exemplary embodiment of the present invention;

FIG. 11 is an exemplary diagram illustrating how host memory that is associated with a system image may be made available to a virtual adapter that is associated with that system image through a LPAR manager in accordance with an exemplary embodiment of the present invention;

DETAILED DESCRIPTION OF THE PREFERRED EMBODIMENT

Figure 4:
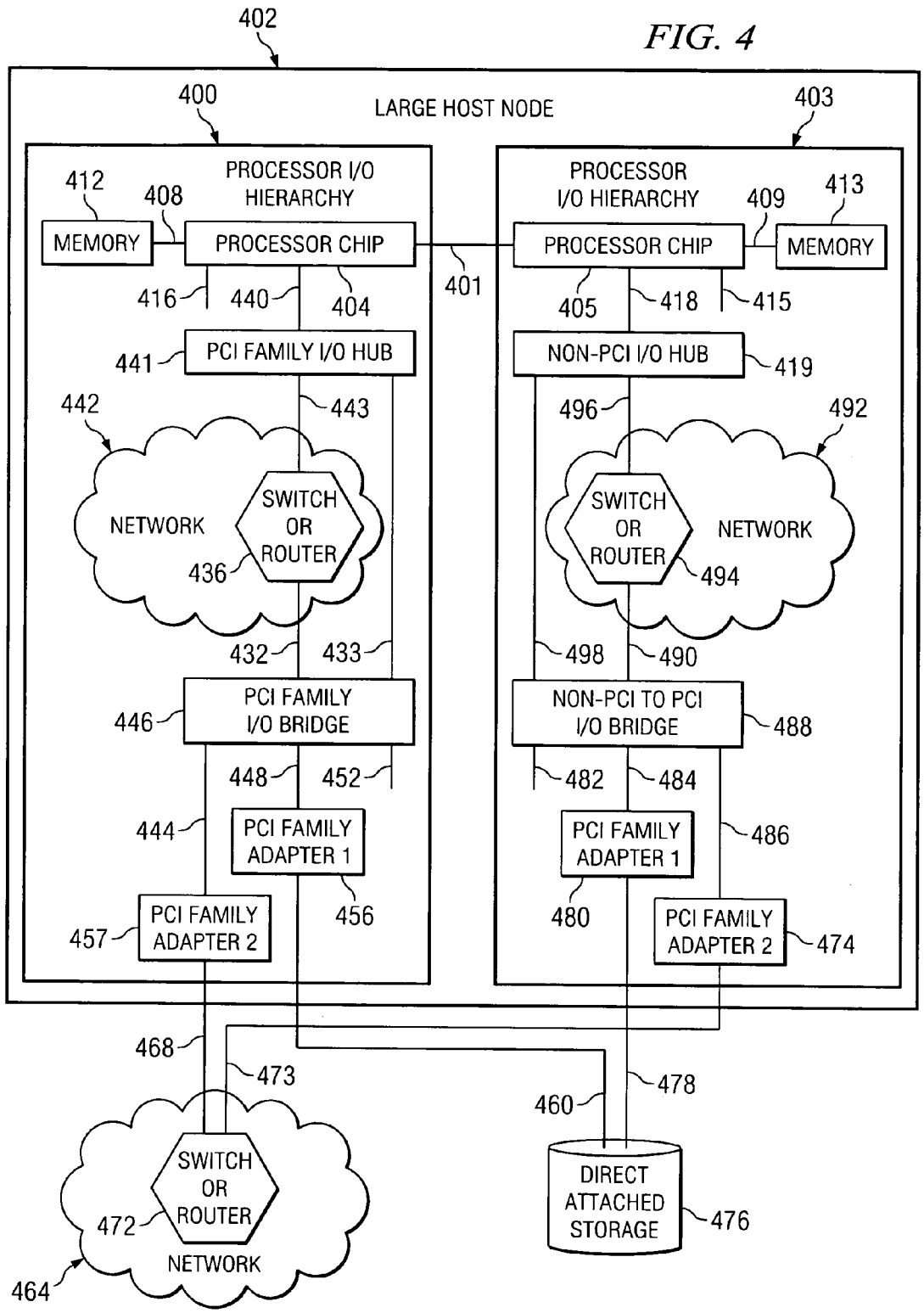
FIG. 4 is an exemplary functional block diagram of a large host processor node in accordance with an exemplary embodiment of the present invention.

The present invention applies to any general or special purpose host that uses a PCI family I/O adapter to directly attach a storage device or to attach to a network, where the network consists of endnodes, switches, routers and the links interconnecting these components. The network links can be, for example, Fibre Channel, Ethernet, InfiniBand, Advanced Switching Interconnect, or a proprietary link that uses proprietary or standard protocols. While embodiments of the present invention are shown and described as employing a peripheral component interconnect (PCI) family adapter, implementations of the invention are not limited to such a configuration as will be apparent to those skilled in the art. Teachings of the invention may be implemented on any physical adapter that support a memory mapped input/output (MMIO) interface, such as, but not limited to, Hyper-Transport, Rapid I/O, proprietary MMIO interfaces, or other adapters having a MMIO interface now know or later developed. Implementations of the present invention utilizing a PCI family adapter are provided for illustrative purposes to facilitate an understanding of the invention.

With reference now to the figures and in particular with reference to FIG. 1, a diagram of a distributed computer system is illustrated in accordance with a preferred embodiment of the present invention. The distributed computer system represented in FIG. 1 takes the form of a network, such as network 120, and is provided merely for illustrative purposes and the embodiments of the present invention described below can be implemented on computer systems of numerous other types and configurations. Two switches (or routers) are shown inside of network 120—switch 116 and switch 140. Switch 116 connects to small host node 100 through port 112. Small host node 100 also contains a second type of port 104 which connects to a direct attached storage subsystem, such as direct attached storage 108.

Network 120 can also attach large host node 124 through port 136 which attaches to switch 140. Large host node 124 can also contain a second type of port 128, which connects to a direct attached storage subsystem, such as direct attached storage 132.

Network 120 can also attach a small integrated host node which is connected to network 120 through port 148 which attaches to switch 140. Small integrated host node 144 can also contain a second type of port 152 which connects to a direct attached storage subsystem, such as direct attached storage 156.

Turning next to FIG. 2, a functional block diagram of a small host node is depicted in accordance with a preferred embodiment of the present invention. Small host node 202 is an example of a host processor node, such as small host node 100 shown in FIG. 1.

In this example, small host node 202, shown in FIG. 2, includes two processor I/O hierarchies, such as processor I/O hierarchy 200 and 203, which are interconnected through link 201. In the illustrative example of FIG. 2, processor I/O hierarchy 200 includes processor chip 207 which includes one or more processors and their associated caches. Processor chip 207 is connected to memory 212 through link 208. One of the links on processor chip, such as link 220, connects to PCI family I/O bridge 228. PCI family I/O bridge 228 has one or more PCI family (PCI, PCI-X, PCI-Express, or any future generation of PCI) links that is used to connect other PCI family I/O bridges or a PCI family I/O adapter, such as PCI family adapter 244 and PCI family adapter 245, through a PCI link, such as link 232, 236, and 240. PCI family adapter 245 can also be used to connect a network, such as network 264, through a link via either a switch or router, such as switch or router 260. PCI family adapter 244 can be used to connect direct attached storage, such as direct attached storage 252, through link 248. Processor I/O hierarchy 203 may be configured in a manner similar to that shown and described with reference to processor I/O hierarchy 200.

With reference now to FIG. 3, a functional block diagram of a small integrated host node is depicted in accordance with a preferred embodiment of the present invention. Small integrated host node 302 is an example of a host processor node, such as small integrated host node 144 shown in FIG. 1.

In this example, small integrated host node 302 includes two processor I/O hierarchies 300 and 303, which are interconnected through link 301. In the illustrative example, processor I/O hierarchy 300 includes processor chip 304, which is representative of one or more processors and associated caches. Processor chip 304 is connected to memory 312 through link 308. One of the links on the processor chip, such as link 330, connects to a PCI Family Adapter, such as PCI family adapter 345. Processor chip 304 has one or more PCI family (PCI, PCI-X, PCI-Express, or any future generation of PCI) links that is used to connect either PCI family I/O bridges or a PCI family I/O adapter, such as PCI Family Adapter 344 and PCI Family Adapter 345 through a PCI link, such as link 316, 330, and 324. PCI family adapter 345 can also be used to connect with a network, such as network 364, through link 356 via either a switch or router, such as switch or router 360. PCI family adapter 344 can be used to connect with direct attached storage 352 through link 348.

Turning now to FIG. 4, a functional block diagram of a large host node is depicted in accordance with a preferred embodiment of the present invention. Large host node 402 is an example of a host processor node, such as large host node 124 shown in FIG. 1.

In this example, large host node 402 includes two processor I/O hierarchies 400 and 403 interconnected through link 401. In the illustrative example of FIG. 4, processor I/O hierarchy 400 includes processor chip 404, which is representative of one or more processors and associated caches. Processor Chip 404 is connected to memory 412 through link 408. One of the links, such as link 440, on the processor chip connects to a PCI family I/O hub, such as PCI family I/O hub 441. The PCI family I/O hub uses a network 442 to attach to a PCI family I/O bridge 448. That is, PCI family I/O bridge 448 is connected to switch or router 436 through link 432 and switch or router 436 also attaches to PCI family I/O hub 441 through link 443. Network 442 allows the PCI family I/O hub and PCI family I/O bridge to be placed in different packages. PCI family I/O bridge 448 has one or more PCI family (PCI, PCI-X, PCI-Express, or any future generation of PCI) links that is used to connect with other PCI family I/O bridges or a PCI family I/O adapter, such as PCI family adapter 456 and PCI family adapter 457 through a PCI link, such as link 444, 448, and 452. PCI family adapter 456 can be used to connect direct attached storage 476 through link 460. PCI family adapter 457 can also be used to connect with network 464 through link 468 via, for example, either a switch or router 472.

Turning next to FIG. 5, illustrations of the phases contained in a PCI bus transaction 500 and a PCI-X bus transaction 520 are depicted in accordance with a preferred embodiment of the present invention. PCI bus transaction 500 depicts the conventional PCI bus transaction that forms the unit of information which is transferred through a PCI fabric for conventional PCI. PCI-X bus transaction 520 depicts the PCI-X bus transaction that forms the unit of information which is transferred through a PCI fabric for PCI-X.

PCI bus transaction 500 shows three phases: an address phase 508; a data phase 512; and a turnaround cycle 516. Also depicted is the arbitration for next transfer 504, which can occur simultaneously with the address, data, and turnaround cycle phases. For PCI, the address contained in the address phase is used to route a bus transaction from the adapter to the host and from the host to the adapter.

PCI-X transaction 520 shows five phases: an address phase 528; an attribute phase 532; a response phase 560; a data phase 564; and a turnaround cycle 566. Also depicted is the arbitration for next transfer 524 which can occur simultaneously with the address, attribute, response, data, and turnaround cycle phases. Similar to conventional PCI, PCI-X uses the address contained in the address phase to route a bus transaction from the adapter to the host and from the host to the adapter. However, PCI-X adds the attribute phase 532 which contains three fields that define the bus transaction requester, namely: requestor bus number 544, requester device number 548, and requester function number 552 (collectively referred to herein as a BDF). The bus transaction also contains a Tag 540 that uniquely identifies the specific bus transaction in relation to other bus transactions that are outstanding between the requester and a responder. The Byte Count 556 contains a count of the number of bytes being sent.

Figure 6:
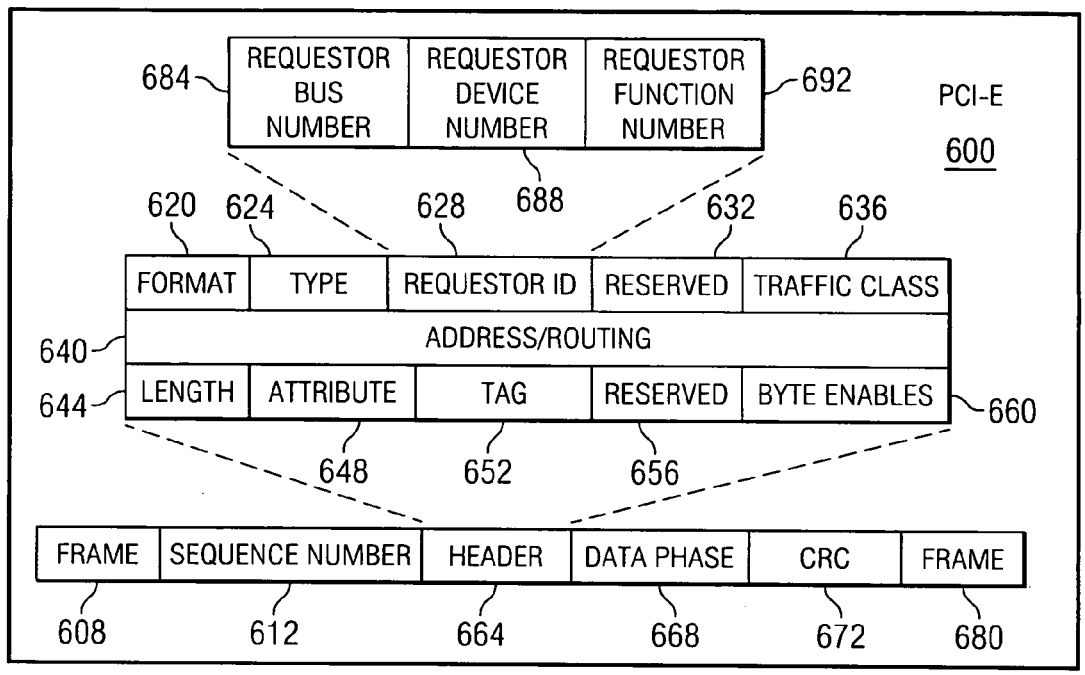
FIG. 6 is an exemplary diagram illustrating elements of the serial PCI bus protocol (PCI-Express, a.k.a. PCI-E) in accordance with an exemplary embodiment of the present invention.

Turning now to FIG. 6, an illustration of the phases contained in a PCI-Express bus transaction is depicted in accordance with a preferred embodiment of the present invention. PCI-E bus transaction 600 forms the unit of information which is transferred through a PCI fabric for PCI-E.

PCI-E bus transaction 600 shows six phases: frame phase 608; sequence number 612; header 664; data phase 668; cyclical redundancy check (CRC) 672; and frame phase 680. PCI-E Header 664 contains a set of fields defined in the PCI-Express specification. The requester identifier (ID) field 628 contains three fields that define the bus transaction requester, namely: requester bus number 684, requester device number 688, and requestor function number 692. The PCI-E header also contains tag 652, which uniquely identifies the specific bus transaction in relation to other bus transactions that are outstanding between the requester and a responder. The length field 644 contains a count of the number of bytes being sent.

Figure 7:
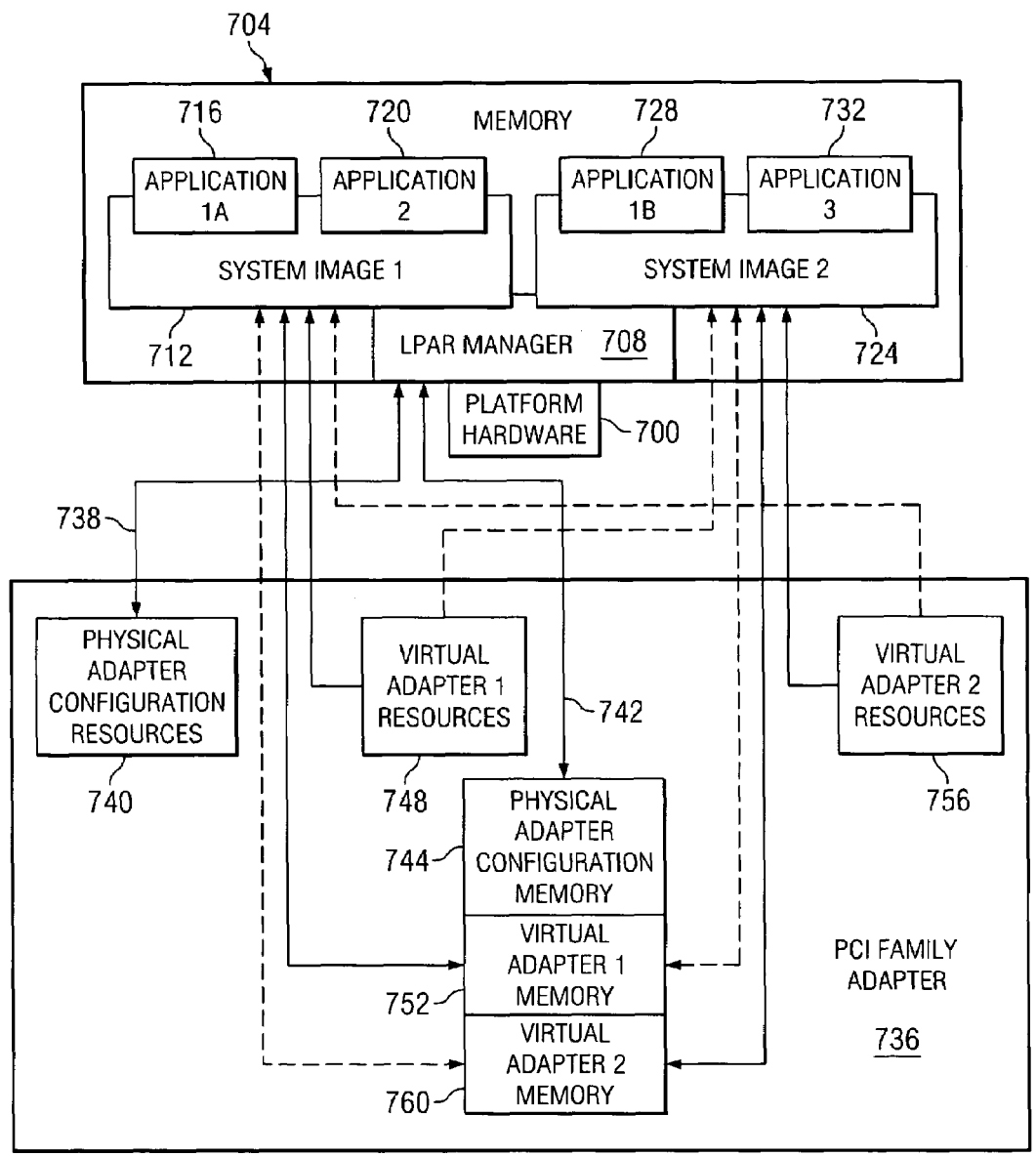
FIG. 7 is an exemplary diagram illustrating I/O virtualization functions that may be provided in a host processor node in order to provide virtual host access isolation in accordance with an exemplary embodiment of the present invention.

With reference now to FIG. 7, a functional block diagram of a PCI adapter, such as PCI family adapter 736, and the firmware and software that run on host hardware (e.g. processor with possibly an I/O hub or I/O bridge), such as host hardware 700, is depicted in accordance with a preferred embodiment of the present invention.

FIG. 7 also shows a logical partitioning (LPAR) manager 708 running on host hardware 700. LPAR manager 708 may be implemented as a Hypervisor manufactured by International Business Machines, Inc. of Armonk, N.J. LPAR manager 708 can run in firmware, software, or a combination of the two. LPAR manager 708 hosts two system image (SI) partitions, such as System Image 712 and System Image 724 (illustratively designated system image 1 and system image 2). The System Image partitions may be respective operating systems running in software, a special purpose image running in software, such as a storage block server or storage file server image, or a special purpose image running in firmware. Applications can run on these system images, such as applications 716, 720, 728, and 732 (illustratively designated application 1A, application 2, application 1B and application 3). Applications 716 and 728 are representative of separate instances of a common application program, and are thus illustratively designated with respective references of "1A" and "1B". In the illustrative example, application 716 and 720 run on system image 712 and applications 728 and 732 run on system image 724. As referred to herein, a virtual host comprises a system image, such as system image 712, or the combination of a system image and applications running within the system image. Thus, two virtual hosts are depicted in FIG. 7.

PCI family adapter 736 contains a set of physical adapter configuration resources 740 and physical adapter memory resources 744. The physical adapter configuration resources 740 and physical adapter memory resources 744 contain information describing the number of virtual adapters that PCI Family Adapter 736 can support and the physical resources allocated to each virtual adapter. As referred to herein, a virtual adapter is an allocation of a subset of physical adapter resources, such as a subset of physical adapter resources and physical adapter memory, that is associated with a logical partition, such as system image 712 and applications 716 and 720 running on system image 712. LPAR manager 708 provides a physical configuration resource interface 738, and physical memory configuration interface 742 to read and write into the physical adapter configuration resource and memory spaces during the adapter's initial configuration and reconfiguration. Through the physical configuration resource interface 738 and physical configuration memory interface 742, LPAR manager 708 creates virtual adapters and assigns physical resources to each virtual adapter. The LPAR manager 708 may use one of the system images, for example a special software or firmware partition, as a hosting partition that uses physical configuration resource interface 738 and physical configuration memory interface 742 to perform a portion, or even all, of the virtual adapter initial configuration and reconfiguration functions.

FIG. 7 shows a configuration of PCI family adapter 736 configured with two virtual adapters. A first virtual adapter (designated virtual adapter 1) comprises virtual adapter resources 748 and virtual adapter memory 752 that were assigned by LPAR manager 708 to be associated with system image 712 (designated system image 1). Similarly, a second virtual adapter (designated virtual adapter 2) comprises virtual adapter resources 756 and virtual adapter memory 760 that were assigned by LPAR manager 708 to virtual adapter 2 and are associated with another system image 724 (designated system image 2). For an adapter used to connect to a direct attached storage, such as direct attached storage 108, 132, or 156 shown in FIG. 1, examples of virtual adapter resources may include: the list of the associated physical disks, a list of the associated logical unit numbers, and a list of the associated adapter functions (e.g., redundant arrays of inexpensive disks (RAID) level). For an adapter used to connect to a Network, such s Network 120 of FIG. 1, examples of Virtual Adapter Resources may include: the list of the associated link level identifiers, a list of the associated network level identifiers, a list of the associated virtual fabric identifiers (e.g. Virtual LAN IDs for Ethernet fabrics, N-port IDs for Fibre Channel fabrics, and Partition Keys for InfiniBand fabrics), and a list of the associated network layers functions (e.g. network offload services).

After LPAR manager 708 configures the PCI Family Adapter 736, each System Image is allowed to only communicate with the virtual adapters that were associated with that system image by LPAR manager 708. As shown in FIG. 7 (by solid lines), system image 712 is allowed to directly communicate with virtual adapter resources 748 and virtual adapter memory 752 of virtual adapter 1. System image 712 is not allowed to directly communicate with virtual adapter resources 756 and virtual adapter memory 760 of virtual adapter 2 as shown in FIG. 7 by dashed lines. Similarly, system image 724 is allowed to directly communicate with virtual adapter resources 756 and virtual adapter memory 760 of virtual adapter 2, and is not allowed to directly communicate with virtual adapter resources 748 and virtual adapter memory 752 of virtual adapter 1.

Figure 8:
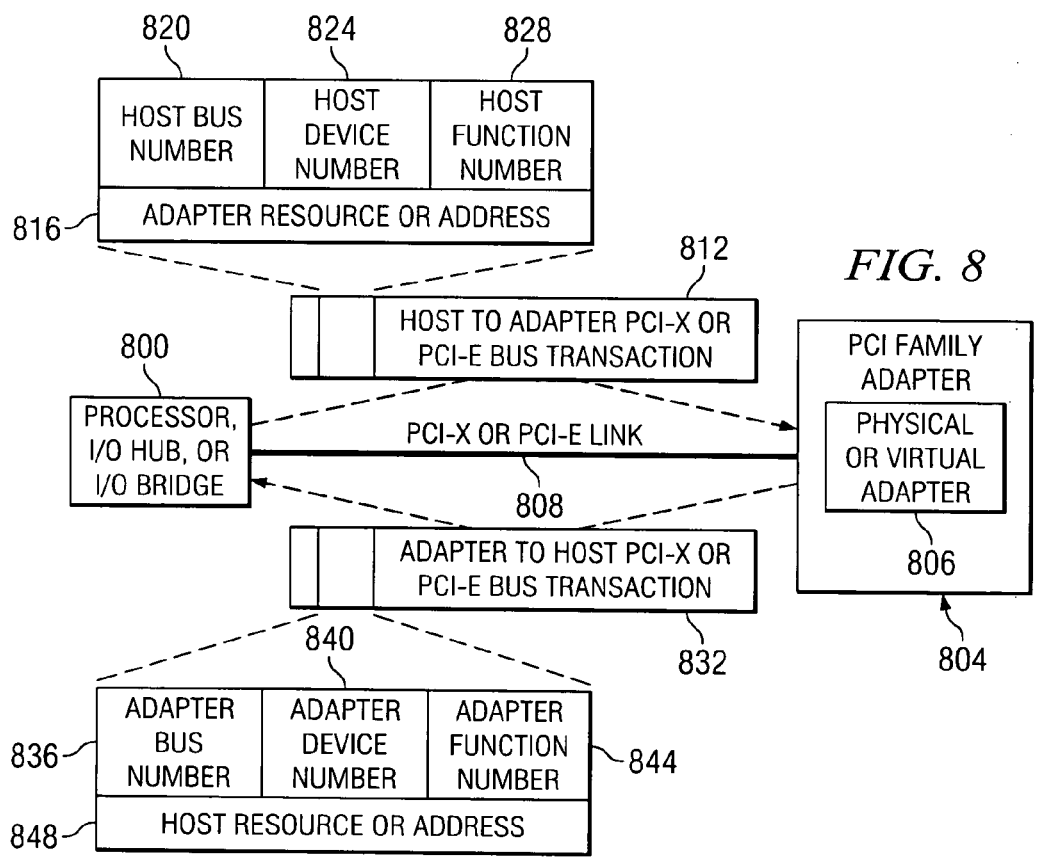
FIG. 8 is an exemplary diagram illustrating control fields used in a PCI Bus Transaction to identify a virtual adapter or system image in accordance with an exemplary embodiment of the present invention.

With reference now to FIG. 8, a depiction of a component, such as a processor, I/O hub, or I/O bridge 800, inside a host node, such as small host node 100, large host node 124, or small, integrated host node 144 shown in FIG. 1, that attaches a PCI family adapter, such as PCI family adapter 804, through a PCI-X or PCI-E link, such as PCI-X or PCI-E Link 808, in accordance with a preferred embodiment of the present invention is shown.

FIG. 8 shows that when a system image, such as system image 712 or 724, or LPAR manager 708, performs a PCI-X or PCI-E bus transaction, such as host to adapter PCI-X or PCI-E bus transaction 812, the processor, I/O hub, or I/O bridge 800 that connects to the PCI-X or PCI-E link 808 which issues the host to adapter PCI-X or PCI-E bus transaction 812 fills in the bus number, device number, and function number fields in the PCI-X or PCI-E bus transaction. The processor, I/O hub, or I/O bridge 800 has two choices for how to fill in these three fields: it can either use the same bus number, device number, and function number for all software components that use the processor, I/O hub, or I/O bridge 800; or it can use a different bus number, device number, and function number for each software component that uses the processor, I/O hub, or I/O bridge 800. The initiator of the transaction may be a software component, such as system image 712 or system image 724 (or an application running on a system image), or LPAR manager 708.

If the processor, I/O hub, or I/O bridge 800 uses the same bus number, device number, and function number for all transaction initiators, then when a software component initiates a PCI-X or PCI-E bus transaction, such as host to adapter PCI-X or PCI-E Bus Transaction 812, the processor, I/O hub, or I/O bridge 800 places the processor, I/O hub, or I/O bridge's bus number in the PCI-X or PCI-E bus transaction's requester bus number 820 field, such as requestor bus number 544 field of the PCI-X transaction shown in FIG. 5 or requester bus number 684 field of the PCI-E transaction shown in FIG. 6.

Similarly, the processor, I/O hub, or I/O bridge 800 places the processor, I/O hub, or I/O bridge's device number in the PCI-X or PCI-E bus transaction's requester device number 824 field, such as requester device number 548 field shown in FIG. 5 or requester device number 688 field shown in FIG. 6. Finally, the processor, I/O hub, or I/O bridge 800 places the processor, I/O hub, or I/O bridge's function number in the PCI-X or PCI-E bus transaction's requester function number 828 field, such as requester function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address 816 field in FIG. 8.

If the processor, I/O hub, or I/O bridge 800 uses a different bus number, device number, and function number for each transaction initiator, then the processor, I/O hub, or I/O bridge 800 assigns a bus number, device number, and function number to the transaction initiator. When a software component initiates a PCI-X or PCI-E bus transaction, such as host to adapter PCI-X or PCI-E bus transaction 812, the processor, I/O hub, or I/O bridge 800 places the software component's bus number in the PCI-X or PCI-E bus transaction's requester bus number 820 field, such as requester bus number 544 field shown in FIG. 5 or requester bus number 684 field shown in FIG. 6. Similarly, the processor, I/O hub, or I/O bridge 800 places the software component's device number in the PCI-X or PCI-E bus transaction's requester device number 824 field, such as requester device number 548 field shown in FIG. 5 or requester device number 688 field shown in FIG. 6. Finally, the processor, I/O hub, or I/O bridge 800 places the software component's function number in the PCI-X or PCI-E bus transaction's requester function number 828 field, such as requester function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address field 816 in FIG. 8.

FIG. 8 also shows that when physical or virtual adapter 806 performs PCI-X or PCI-E bus transactions, such as adapter to host PCI-X or PCI-E bus transaction 832, the PCI family adapter, such as physical family adapter 804, that connects to PCI-X or PCI-E Link 808 which issues the adapter to host PCI-X or PCI-E bus transaction 832 places the bus number, device number, and function number associated with the physical or virtual adapter that initiated the bus transaction in the requester bus number, device number, and function number 836, 840, and 844 fields. Notably, to support more than one bus or device number, PCI family adapter 804 must support one or more internal busses (For a PCI-X Adapter, see the PCI-X Addendum to the PCI Local Bus Specification Revision 1.0 or 1.0a; for a PCI-E Adapter see PCI-Express Base Specification Revision 1.0 or 1.0a the details of which are herein incorporated by reference).

To perform this function, LPAR manager 708 associates each physical or virtual adapter to a software component running by assigning a bus number, device number, and function number to the physical or virtual adapter. When the physical or virtual adapter initiates an adapter to host PCI-X or PCI-E bus transaction, PCI family adapter 804 places the physical or virtual adapter's bus number in the PCI-X or PCI-E bus transaction's requester bus number 836 field, such as requester bus number 544 field shown in FIG. 5 or requester bus number 684 field shown in FIG. 6 (shown in FIG. 8 as adapter bus number 836). Similarly, PCI family adapter 804 places the physical or virtual adapter's device number in the PCI-X or PCI-E bus transaction's requester device number 840 field, such as Requestor device Number 548 field shown in FIG. 5 or requester device number 688 field shown in FIG. 6 (shown in FIG. 8 as adapter device number 840). PCI family adapter 804 places the physical or virtual adapter's function number in the PCI-X or PCI-E bus transaction's requester function number 844 field, such as requester function number 552 field shown in FIG. 5 or requester function number 692 field shown in FIG. 6 (shown in FIG. 8 as adapter function number 844). Finally, PCI family adapter 804 also places in the PCI-X or PCI-E bus transaction the memory address of the software component that is associated, and targeted by, the physical or virtual adapter in host resource or address 848 field.

Figure 9:
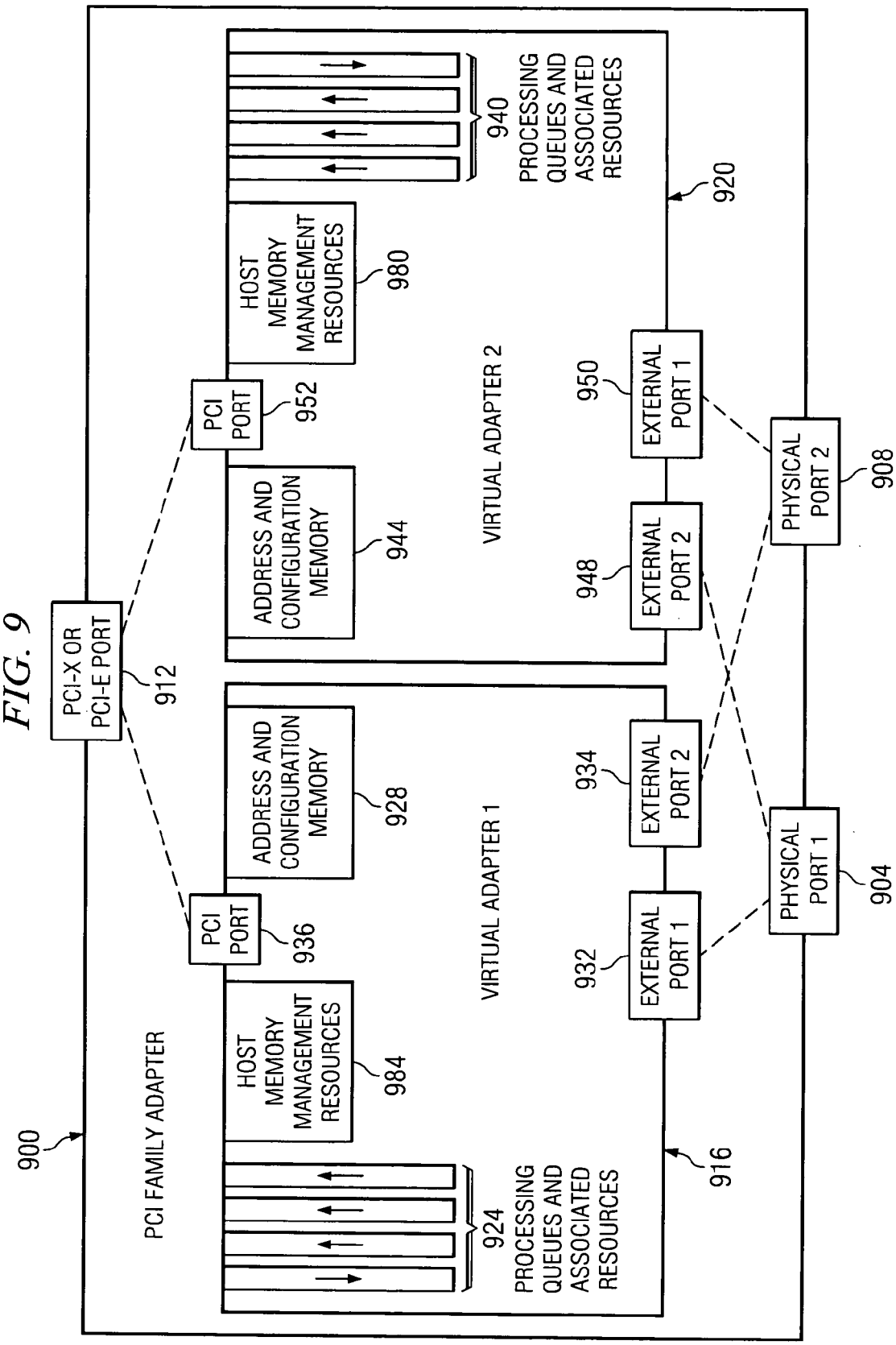
FIG. 9 is an exemplary diagram illustrating Adapter resources that may be virtualized in order to allow: an Adapter to directly access virtual host resources; allow a virtual host to directly access Adapter resources; and allow a non-PCI port on the Adapter to access resources on the Adapter or host in accordance with an exemplary embodiment of the present invention.

With reference now to FIG. 9, a functional block diagram of a PCI adapter with two virtual adapters depicted in accordance with a preferred embodiment of the present invention is shown. Exemplary PCI family adapter 900 is configured with two virtual adapters 916 and 920 (illustratively designated virtual adapter 1 and virtual adapter 2). PCI family adapter 900 may contain one (or more) PCI family ports (also referred to herein as an upstream port), such as PCI-X or PCI-E Port 912. PCI family adapter 900 may also contain one (or more) device or network ports (also referred to herein as downstream ports), such as Physical Port 904 and Physical Port 908.

FIG. 9 also shows the types of resources that can be virtualized on a PCI adapter. The resources of PCI family adapter 900 that may be virtualized include processing queues, address and configuration memory, PCI ports, host memory management resources and device or network ports. In the illustrative example, virtualized resources of PCI family adapter 900 allocated to virtual adapter 916 include, for example, processing queues 924, address and configuration memory 928, PCI port 936, host memory management resources 984 (such as memory region registration and memory window binding resources on InfiniBand or iWARP), and device or network ports, such as external port 932 and external port 934. Similarly, virtualized resources of PCI family adapter 900 allocated to virtual adapter 920 include, for example, processing queues 940, address and configuration memory 944, PCI port 952, host memory management resources 980, and device or network ports, such as External Port 948 and External Port 950.

Turning next to FIG. 10, a functional block diagram of the access control levels on a PCI family adapter, such as PCI family adapter 900 shown in FIG. 9, is depicted in accordance with a preferred embodiment of the present invention. The three levels of access are a super-privileged physical resource allocation level 1000, a privileged virtual resource allocation level 1008, and a non-privileged level, 1016.

The functions performed at the super-privileged physical resource allocation level 1000 include but are not limited to: PCI family adapter queries, creation, modification and deletion of virtual adapters, submission and retrieval of work, reset and recovery of the physical adapter, and allocation of physical resources to a virtual adapter instance. The PCI family adapter queries are used to determine, for example, the physical adapter type (e.g. Fibre Channel, Ethernet, iSCSI, parallel SCSI), the functions supported on the physical adapter, and the number of virtual adapters supported by the PCI family adapter. The LPAR manager, such as LPAR manager 708 shown in FIG. 7, performs the physical adapter resource management 1004 functions associated with super-privileged physical resource allocation level 1000. However, the LPAR manager may use a system image, for example an I/O hosting partition, to perform the physical adapter resource management 1004 functions.

The functions performed at the privileged virtual resource allocation level 1008 include, for example, virtual adapter queries, allocation and initialization of virtual adapter resources, reset and recovery of virutal adatper resrouces, submission and retrieval of work through virtual adapter resources, and, for virtual adapters that support offload services, allocation and assignment of virtual adapter resources to a middleware process or thread instance. The virtual adapter queries are used to determine: the virtual adapter type (e.g. Fibre Channel, Ethernet, iSCSI, parallel SCSI) and the functions supported on the virtual adapter. A system image, such as system image 712 shown in FIG. 7, performs the privileged virtual adapter resource management 1012 functions associated with virtual resource allocation level 1008.

Finally, the functions performed at the non-privileged level 1016 include, for example, query of virtual adapter resources that have been assigned to software running at the non-privileged level 1016 and submission and retrieval of work through virtual adapter resources that have been assigned to software running at the non-privileged level 1016. An application, such as application 716 shown in FIG. 7, performs the virtual adapter access library 1020 functions associated with non-privileged level 1016.

Turning next to FIG. 11, a functional block diagram of host memory addresses that are made accessible to a PCI family adapter is depicted in accordance with a preferred embodiment of the present invention. PCI family adapter 1101 is an example of PCI family adapter 900 that may have virtualized resources as described above in FIG. 9.

FIG. 11 depicts four different mechanisms by which a LPAR manager 708 can associate host memory to a system image and to a virtual adapter. Once host memory has been associated with a system image and a virtual adapter, the virtual adapter can then perform DMA write and read operations directly to the host memory. System images 1108 and 1116 are examples of system images, such as system images 712 and 724 described above with reference to FIG. 7, which are respectively associated with virtual adapters 1104 and 1112. Virtual adapters 1104 and 1112 are examples of virtual adapters, such as virtual adapters 916 and 920 described above with reference to FIG. 9, which comprise respective allocations of virtual adapter resources and virtual adapter memory.

The first exemplary mechanism that LPAR manager 708 can use to associate and make available host memory to a system image and to one or more virtual adapters is to write into the virtual adapter's resources a system image association list 1122. Virtual adapter resources 1120 contains a list of PCI bus addresses, where each PCI bus address in the list is associated by the platform hardware to the starting address of a system image (SI) page, such as SI 1 page 1 1128 through SI 1 page N 1136 allocated to system image 1108. Virtual adapter resources 1120 also contains the page size, which is equal for all the pages in the list. At initial configuration, and during reconfigurations, LPAR manager 708 loads system image association list 1122 into virtual adapter resources 1120. The system image association list 1122 defines the set of addresses that virtual adapter 1104 can use in DMA write and read operations.

After the system image association list 1122 has been created, virtual adapter 1104 must validate that each DMA write or DMA read requested by system image 1108 is contained within a page in the system image association list 1122. If the DMA write or DMA read requested by system image 1108 is contained within a page in the system image association list 1122, then virtual adapter 1104 may perform the operation. Otherwise virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122.

In a similar manner, virtual adapter 1112 associated with system image 1116 validates DMA write or read requests submitted by system image 1116. Particularly, virtual adapter 1112 provides validation for DMA read and write requests from system image 1116 by determining whether the DMA write or read request is in a page in system image association list (configured in a manner similarly to system image association list 1122) associated with system image pages of system image 1116.

The second mechanism that LPAR manager 708 can use to associate and make available host memory to a system image and to one or more virtual adapters is to write a starting page address and page size into system image association list 1122 in the virtual adapter's resources. For example, virtual adapter resources 1120 may contain a single PCI bus address that is associated by the platform hardware to the starting address of a system image page, such as SI 1 Page 1 1128. System image association list 1122 in virtual adapter resources 1120 also contains the size of the page. At initial configuration, and during reconfigurations, LPAR manager 708 loads the page size and starting page address into system image association list 1122 into the virtual adapter resources 1120. The system image association list 1122 defines the set of addresses that virtual adapter 1104 can use in DMA write and read operations.

After the system image association list 1122 has been created, virtual adapter 1104 validates whether each DMA write or DMA read requested by system image 1108 is contained within a page in system image association list 1122. If the DMA write or DMA read requested by system image 1108 is contained within a page in the system image association list 1122, then virtual adapter 1104 may perform the operation. Otherwise, virtual adapter 1104 is prohibited from performing the operation.

Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 may validate DMA write or read requests submitted by system image 1116. Particularly, a system image association list similar to system image association list 1122 may be associated with virtual adapter 1112. The system image association list associated with virtual adapter 1112 is loaded with a page size and starting page address of a system image page of system image 1116 associated with virtual adapter 1112. The system image association list associated with virtual adapter 1112 thus provides a mechanism for validation of DMA read and write requests from system image 1116 by determining whether the DMA write or read request is in a page in a system image association list associated with system image pages of system image 1116.

The third mechanism that LPAR manager 708 can use to associate and make available host memory to a system image and to one or more virtual adapters is to write into the virtual adapter's resources a system image buffer association list 1154. In FIG. 11, virtual adapter resources 1150 contains a list of PCI bus address pairs (starting and ending address), where each pair of PCI bus addresses in the list is associated by the platform hardware to a pair (starting and ending) of addresses of a system image buffer, such as SI 2 Buffer 1 1166 through SI 1 Buffer N 1180 allocated to system image 1116. At initial configuration, and during reconfigurations, LPAR manager 708 loads system image buffer association list 1154 into the virtual adapter resources 1150. The system image buffer association list 1154 defines the set of addresses that virtual adapter 1112 can use in DMA write and read operations.

After the system image buffer association list 1154 has been created, virtual adapter 1112 validates whether each DMA write or DMA read requested by system image 1116 is contained within a buffer in system image buffer association list 1154. If the DMA write or DMA read requested by system image 1116 is contained within a buffer in the system image buffer association list 1154, then virtual adapter 1112 may perform the operation. Otherwise, virtual adapter 1112 is prohibited from performing the operation.

Alternatively, the PCI family adapter 1101 may use a special, LPAR manager-style virtual adapter (rather than virtual adapter 1112) to perform the check that determines if DMA write or DMA read operations requested by system image 1116 is contained within a buffer in the system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains PCI bus starting and ending address pairs in association with system image buffer starting and ending address pairs of buffers allocated to system image 1108 in a manner similar to that described above for system image 1116 and virtual adapter 1112.

The fourth mechanism that LPAR manager 708 can use to associate and make available host memory to a system image and to one or more virtual adapters is to write into the virtual adapter's resources a single starting and ending address in system image buffer association list 1154. In FIG. 11, virtual adapter Resources 1150 contains a single pair of PCI bus starting and ending address that is associated by the platform hardware to a pair (starting and ending) of addresses associated with a system image buffer, such as SI 2 Buffer 1 1166. At initial configuration, and during reconfigurations, LPAR manager 708 loads the starting and ending addresses of SI 2 buffer 1166 into the system image buffer association list 1154 in virtual adapter resources 1150. The system image buffer association list 1154 then defines the set of addresses that virtual adapter 1112 can use in DMA write and read operations.

After the system image buffer association list 1154 has been created, virtual adapter 1112 validates whether each DMA write or DMA read requested by system image 1116 is contained within the system image buffer association list 1154. If the DMA write or DMA read requested by system image 1116 is contained within system image buffer association list 1154, then virtual adapter 1112 may perform the operation. Otherwise, virtual adapter 1112 is prohibited from performing the operation.

Alternatively, the PCI family adapter 1101 may use a special, LPAR manager-style virtual adapter (rather than virtual adapter 1150) to perform the check that determines if DMA write or DMA read requested by system image 1116 is contained within a page system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains a single PCI bus starting and ending address in association with a system image buffer starting and ending address allocated to system image 1108 in a manner similar to that described above for system image 1116 and virtual adapter 1112.

Figure 12:
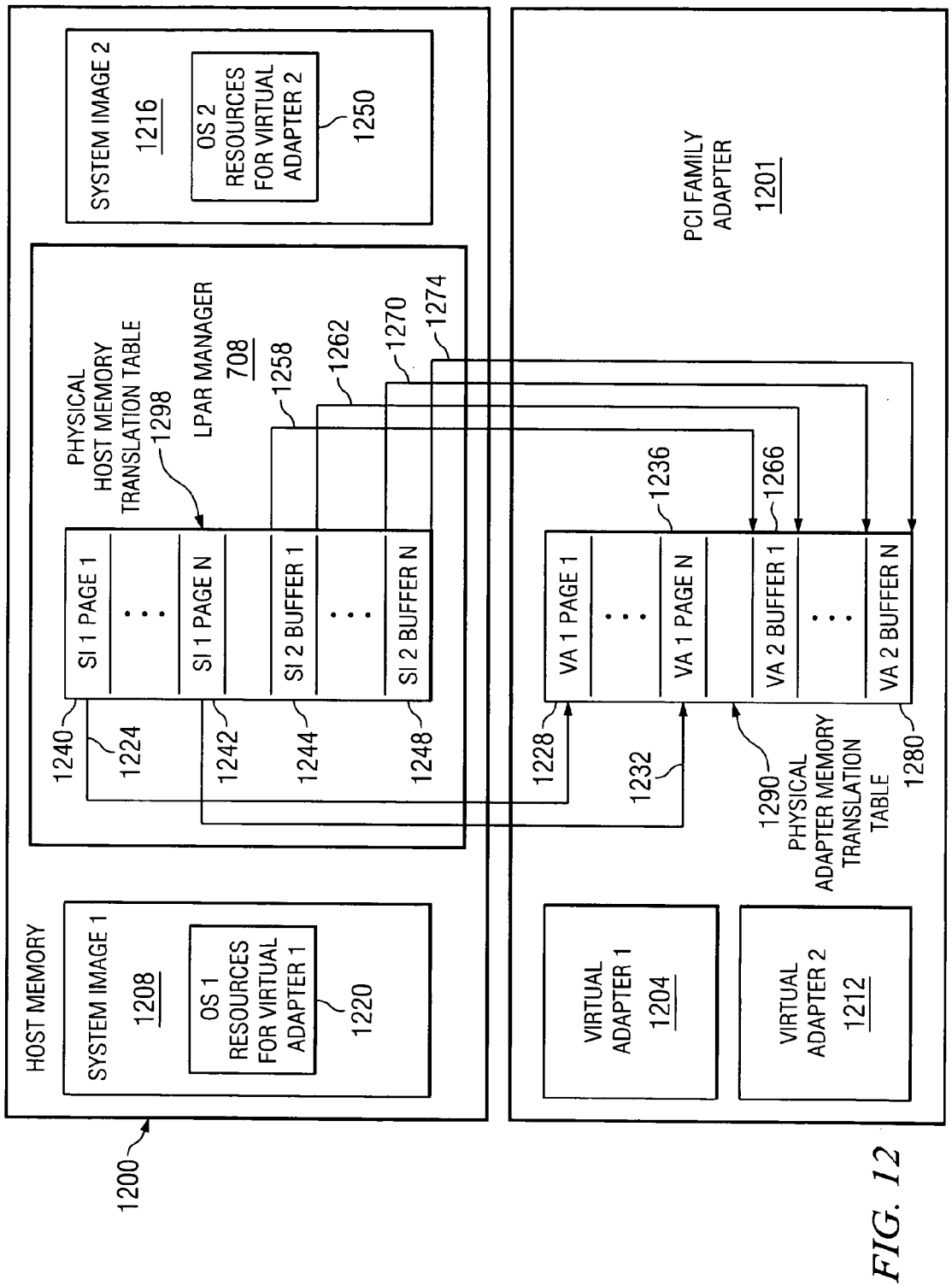
FIG. 12 is an exemplary diagram illustrating how a PCI family adapter may allow a LPAR manager to associate memory in a PCI adapter to a system image and its associated virtual adapter in accordance with an exemplary embodiment of the present invention.

Turning next to FIG. 12, a functional block diagram of a PCI family adapter configured with memory addresses that are made accessible to a system image is depicted in accordance with a preferred embodiment of the present invention.

FIG. 12 depicts four different mechanisms by which a LPAR manager can associate PCI family adapter memory to a virtual adapter, such as virtual adapter 1204, and to a system image, such as system image 1208. Once PCI family adapter memory has been associated to a system image and a virtual adapter, the system image can then perform Memory Mapped I/O write and read (i.e., store and load) operations directly to the PCI family adapter memory.

A notable difference between the system image and virtual adapter configuration shown in FIGS. 11 and FIG. 12 exists. In the configuration shown in FIG. 11, PCI family adapter 1101 only holds a list of host addresses that do not have any local memory associated with them. If the PCI family adapter supports flow-through traffic, then data arriving on an external port can directly flow through the PCI family adapter and be transferred, through DMA writes, directly into these host addresses. Similarly, if the PCI family adapter supports flow-through traffic, then data from these host addresses can directly flow through the PCI family adapter and be transferred out of an external port.

Accordingly, PCI family adapter 1101 shown in FIG. 11 does not include local adapter memory and thus is unable to initiate a DMA operation. On the other hand, PCI family adapter 1201 shown in FIG. 12 has local adapter memory that is associated with the list of host memory addresses. PCI family adapter 1201 can initiate, for example, DMA writes from its local memory to the host memory or DMA reads from the host memory to its local memory. Similarly, the host can initiate, for example, Memory Mapped I/O writes from its local memory to the PCI family adapter memory or Memory Mapped I/O reads from the PCI family adapter memory to the host's local memory.

The first and second mechanisms that LPAR manager 708 can use to associate and make available PCI family adapter memory to a system image and to a virtual adapter is to write into the PCI family adapter's physical adapter memory translation table 1290 a page size and the starting address of one (first mechanism) or more (second mechanism) pages. In this case all pages have the same size. For example, FIG. 12 depicts a set of pages that have been mapped between the system image 1208 and virtual adapter 1204. Particularly, SI 1 page 1 1240 through SI 1 page N 1242 of system image 1208 are mapped (illustratively shown by interconnected arrows) to virtual adapter memory pages 1224-1232 of physical adapter 1201 local memory. For system image 1208, all pages 1240-1242 in the list have the same size. At initial configuration, and during reconfigurations, LPAR manager 708 loads the PCI family adapter's physical adapter memory translation table 1290 with the page size and the starting address of one or more pages. The physical adapter memory translation table 1290 then defines the set of addresses that virtual adapter 1204 can use in DMA write and read operations.

After physical adapter memory translation table 1290 has been created, PCI family adapter 1201 (or virtual adapter 1204) validates that each DMA write or DMA read requested by system image 1208 is contained in the physical adapter memory translation table 1290 and is associated with virtual adapter 1204. If the DMA write or DMA read requested by system image 1208 is contained in the physical adapter memory translation table 1290 and is associated with virtual adapter 1204, then virtual adapter 1204 may perform the operation. Otherwise, virtual adapter 1204 is prohibited from performing the operation.

The physical adapter memory translation table 1290 also defines the set of addresses that system image 1208 can use in Memory Mapped I/O (MMIO) write and read operations. After physical adapter memory translation table 1290 has been created, PCI family adapter 1201 (or virtual adapter 1204) validates whether the Memory Mapped I/O write or read requested by system image 1208 is contained in the physical adapter memory translation table 1290 and is associated with virtual adapter 1204. If the MMIO write or MMIO read requested by system image 1208 is contained in the physical adapter memory translation table 1290 associated with virtual adapter 1204, then virtual adapter 1204 may perform the operation. Otherwise virtual adapter 1204 is prohibited from performing the operation. It should be understood that other system images and associated virtual adapters, e.g., system image 1216 and virtual adapter 1212, are configured in a similar manner for PCI family adapter 1201 (or virtual adapter 1212) validation of DMA operations and MMIO operations requested by system image 1216.

The third and fourth mechanisms that LPAR manager 708 can use to associate and make available PCI family adapter memory to a system image and to a virtual adapter is to write into the PCI family adapter's physical adapter memory translation table 1290 one (third mechanism) or more (fourth mechanism) buffer starting and ending addresses (or starting address and length). In this case, the buffers may have different sizes. For example, FIG. 12 depicts a set of varying sized buffers that have been mapped between system image 1216 and virtual adapter 1212. Particularly, SI 2 Buffer 1 1244 through SI 2 Buffer N 1248 of system image 1216 are mapped to virtual adapter buffers 1258-1274 of virtual adapter 1212. For system image 1216, the buffers in the list have different sizes. At initial configuration, and during reconfigurations, LPAR manager 708 loads the PCI family adapter's physical adapter memory translation table 1290 with the starting and ending address (or starting address and length) of one or more pages. The physical adapter memory translation table 1290 then defines the set of addresses that virtual adapter 1212 can use in DMA write and read operations.

After physical adapter memory translation table 1290 has been created, PCI family adapter 1201 (or virtual adapter 1212) validates that each DMA write or DMA read requested by system image 1216 is contained in the physical adapter memory translation table 1290 and is associated with virtual adapter 1212. If the DMA write or DMA read requested by system image 1216 is contained in the physical adapter memory translation table 1290 and is associated with virtual adapter 1212, then virtual adapter 1212 may perform the operation. Otherwise, virtual adapter 1212 is prohibited from performing the operation.

The physical adapter memory translation table 1290 also defines the set of addresses that system image 1216 can use in Memory Mapped I/O (MMIO) write and read operations. After physical adapter memory translation table 1290 has been created, PCI family adapter 1201 (or virtual adapter 1212) validates whether a MMIO write or read requested by system image 1216 is contained in the physical adapter memory translation table 1290 and is associated with virtual adapter 1212. If the MMIO write or MMIO read requested by system image 1216 is contained in the physical adapter memory translation table 1290 and is associated with virtual adapter 1212, then virtual adapter 1212 may perform the operation. Otherwise virtual adapter 1212 is prohibited from performing the operation. It should be understood that other system images and associated virtual adapters, e.g., system image 1208 and associated virtual adapter 1204, are configured in a similar manner for PCI family adapter 1201 (or virtual adapter 1204) validation of DMA operations and MMIO operations requested by system image 1216.

Figure 13:
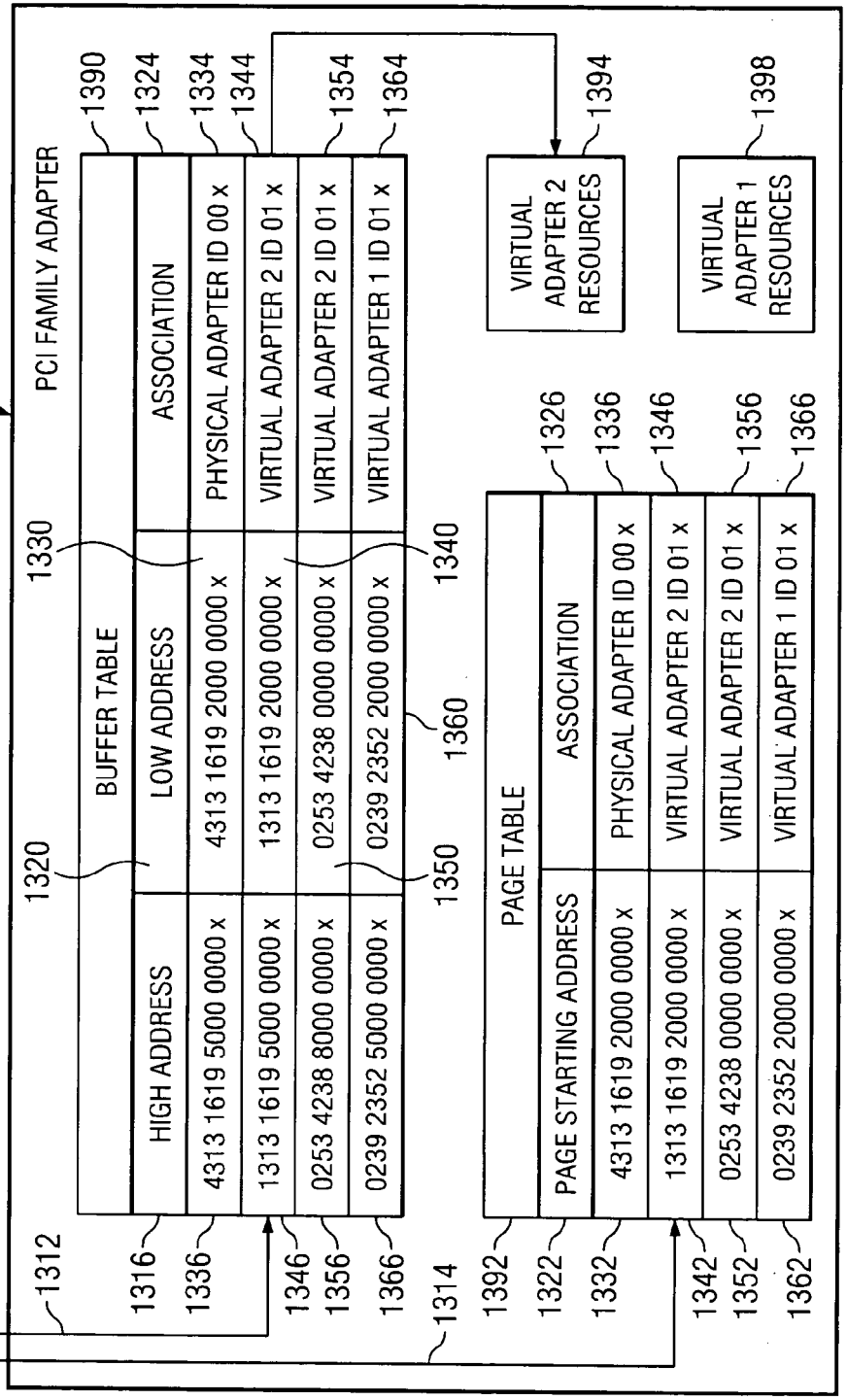
FIG. 13 is an exemplary diagram illustrating one option for determining a virtual adapter that is associated with an incoming memory address to assure that functions performed by an incoming PCI bus transaction are within the scope of the virtual adapter that is associated with a memory address referenced in the incoming PCI bus transaction translation, in accordance with an exemplary embodiment of the present invention.

With reference next to FIG. 13, a functional block diagram of a PCI family adapter and a physical address memory translation table, such as a buffer table or a page table, is depicted in accordance with a preferred embodiment of the present invention.

FIG. 13 also depicts four mechanisms for how an address referenced in an incoming PCI bus transaction 1304 can be used to look up the virtual adapter resources (including the local PCI family adapter memory address that has been mapped to the host address), such as virtual adapter resources 1398 or virtual adapter 1394 resources, associated with the memory address.

The first mechanism is to compare the memory address of incoming PCI bus transaction 1304 with each row of high address 1316 and low address 1320 in buffer table 1390. If incoming PCI bus transaction 1304 has an address that is lower than the contents of high address 1316 cell and that is higher than the contents of low address 1320 cell, then incoming PCI bus transaction 1304 is within the high address and low address cells that are associated with the corresponding virtual adapter. In such a scenario, the incoming PCI bus transaction 1304 is allowed to be performed on the matching virtual adapter.

Alternatively, if incoming PCI bus transaction 1304 has an address that is not between the contents of high address 1316 cell and the contents of low address 1320 cell, then completion or processing of incoming PCI bus transaction 1304 is prohibited. The second mechanism is to simply allow a single entry in buffer table 1390 per virtual adapter.

The third mechanism is to compare the memory address of incoming PCI bus transaction 1304 with each row of page starting address 1322 and with each row of page starting Address 1322 plus the page size in the page table 1392. If incoming PCI bus transaction 1304 has an address that is higher than or equal to the contents of page starting address 1322 cell and lower than page starting address 1322 cell plus the page size, then incoming PCI bus transaction 1304 is within a page that is associated with a virtual adapter. Accordingly, incoming PCI bus transaction 1304 is allowed to be performed on the matching virtual adapter.

Alternatively, if incoming PCI bus transaction 1304 has an address that is not within the contents of page starting address 1322 cell and page starting address 1322 cell plus the page size, then completion of incoming PCI bus transaction 1304 is prohibited. The fourth mechanism is to simply allow a single entry in page table 1392 per virtual adapter.

Figure 14:
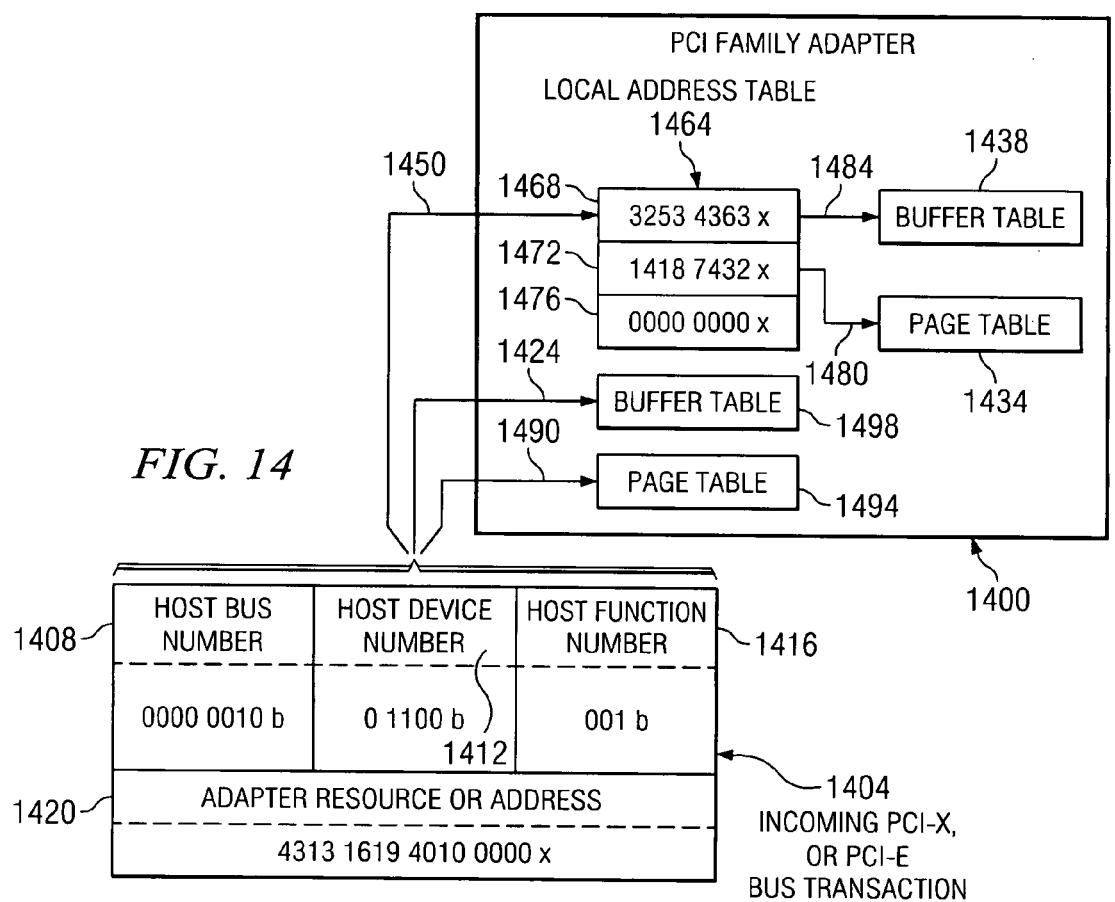
FIG. 14 is a diagram illustrating one option for determining a virtual adapter that is associated with a PCI-X or PCI-E bus transaction to assure that functions performed by an incoming PCI bus transaction are within the scope of the virtual adapter that is associated with a Requestor Bus Number, Requestor Device Number, and Requestor Function Number referenced in the incoming PCI bus transaction translation, in accordance with an exemplary embodiment of the present invention.

With reference next to FIG. 14, a functional block diagram of a PCI family adapter and a physical address memory translation table, such as a buffer table, a page table, or an indirect local address table, is depicted in accordance with a preferred embodiment of the present invention.

FIG. 14 also depicts several mechanisms for how a requester bus number, such as host bus number 1408, a requester device number, such as host device number 1412, and a requester function number, such as host function number 1416, referenced in incoming PCI bus transaction 1404 can be used to index into either buffer table 1498, page table 1494, or indirect local address table 1464. Buffer table 1498 is representative of buffer table 1390 shown in FIG. 13. Page table 1490 is representative of page table 1392 shown in FIG. 13. Local address table 1464 contains a local PCI family adapter memory address that references either a buffer table, such as buffer table 1438, or a page table, such as page table 1434, that only contains host memory addresses that are mapped to the same virtual adapter.

The requestor bus number, such as host bus number 1408, requestor device number, such as host device number 1412, and requestor function number, such as host function number 1416, referenced in incoming PCI bus transaction 1404 provides an additional check beyond the memory address mappings that were set up by a host LPAR manager.

Figure 15:
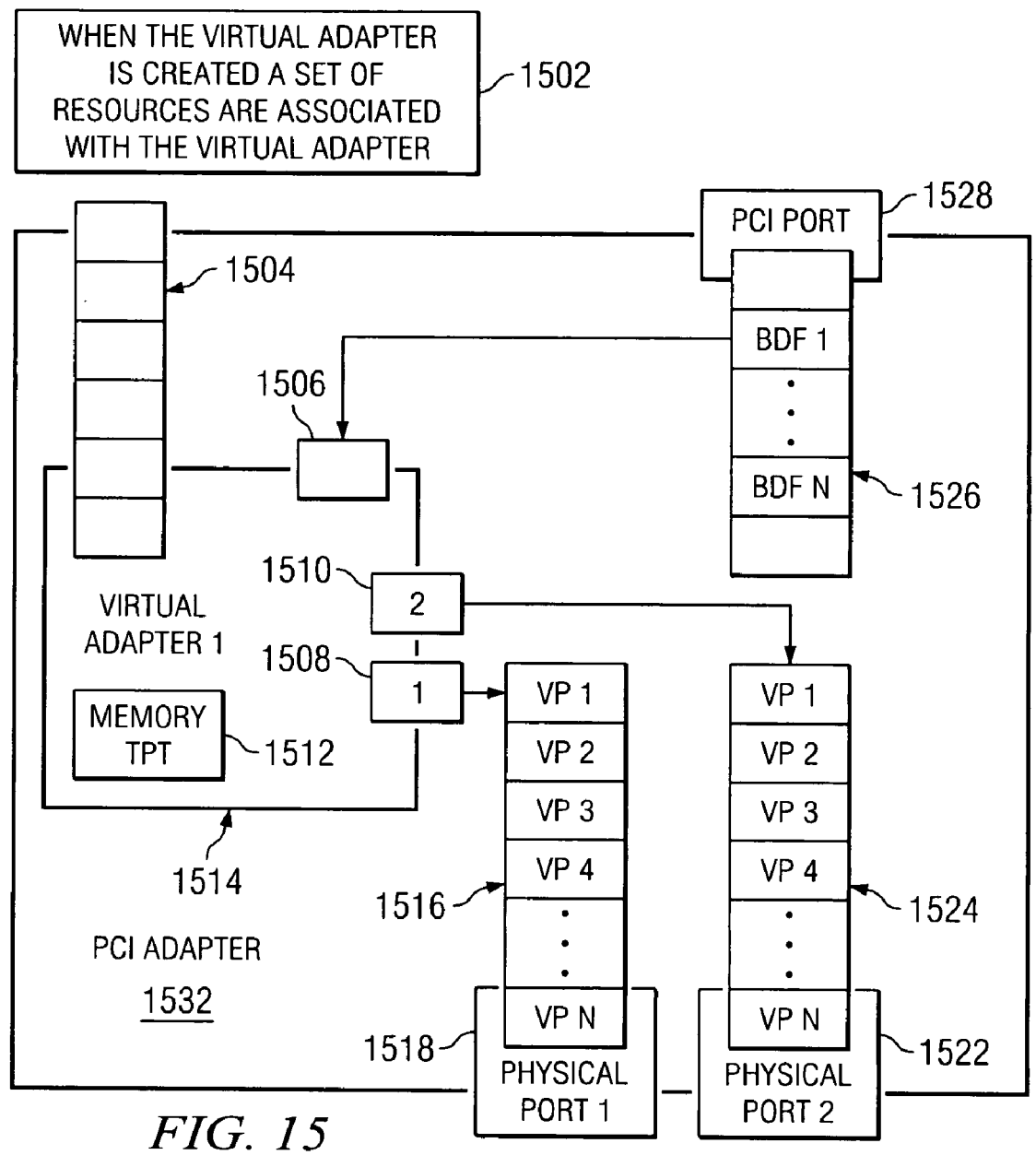
FIG. 15 is an exemplary diagram illustrating a Virtual Adapter management approach for virtualizing an adapter in accordance with an exemplary embodiment of the present invention.

Turning next to FIG. 15, a virtual adapter level management approach is depicted in accordance with a preferred embodiment of the present invention. Under this approach, a physical or virtual host creates one or more virtual adapters, such as virtual adapter 1514, that each contain a set of resources within the scope of the physical adapter, such as PCI adapter 1532. The set of resources associated with virtual adapter 1514 may include, for example: processing queues and associated resources 1504, PCI port 1528 for each PCI physical port, a PCI virtual port that is associated with one of the possible addresses on the PCI physical port, one or more downstream physical ports 1518 and 1522 for each downstream physical port, a downstream virtual port that is associated with one of the possible addresses on physical port 1508 and 1510, and one or more memory translation and protection tables 1512.

As mentioned above, the way in which IO adapters inform host systems of the completion of processing of IO requests or errors in the processing of IO requests is through the sending of interrupts to the host system which are handled by an interrupt handler of the operating system. Interrupt handling can be very expensive in terms of processor performance as the number of interrupts that must be handled by the processor increases. In addition, for IO adapters that serve multiple applications, it is necessary to recognize the source of the interrupt in order to call the associated application.

One solution to this problem is to coalesce interrupts by adding a set of timers that define the maximum pace of interrupts being transferred to the operating system. For example, as described in U.S. Patent Application Publication No. 2004/0054822, which is hereby incorporated by reference, interrupts are coalesced in a buffer and then, once a predetermined condition is met, the contents of the buffer, i.e. the interrupts are placed in a payload of an interrupt control block (ICB) which is sent to the host system.

The solution provided by U.S. Patent Application Publication No. 2004/0054822 works well for a non-virtualized host system. The exemplary embodiments of the present invention extend the mechanism of U.S. Patent Application Publication No. 2004/0054822 to be able to coalesce and report interrupts to a host system utilizing IO virtualization and logically partitioned host system resources such as that described above with regard to FIGS. 1-15.

As described above with regard to FIG. 7, the present invention provides mechanisms for establishing virtual adapters and associating these virtual adapters with logical partitions or system images in the host system. When a virtual adapter needs to report an event, for example, following completion of processing of an inbound or outbound data packet, the virtual adapter needs to send event information to the virtual adapter's partition or system image on the host system in order to notify an appropriate application of this event. The present invention provides a mechanism for establishing and using a partition interrupt control block (PICB) as a means for sending event information from a virtual adapter to an operating system in a logical partition or system image for communication to an appropriate application instance.

The PICB of the present invention is a mechanism for reporting events from a virtual adapter wherein these reports of events are destined for a particular logical partition or system image. The PICB, in the present invention, is a data structure that is updated with event information, e.g., interrupts, in response to events being generated in an associated virtual adapter. These events may be, for example, completion of processing of a data packet, an error being detected, or the like. Event information or interrupts may be coalesced in a virtual adapter buffer and sent to the operating system space after a predetermined condition is met, similar to the way in which the ICB is used in U.S. Patent Application Publication No. 2004/0054822. Alternatively, coalescing of interrupts may not be performed and thus, event information may be written directly to the existing PICB data structure maintained in the operating system memory space without buffering in the virtual adapter.

Figure 17:
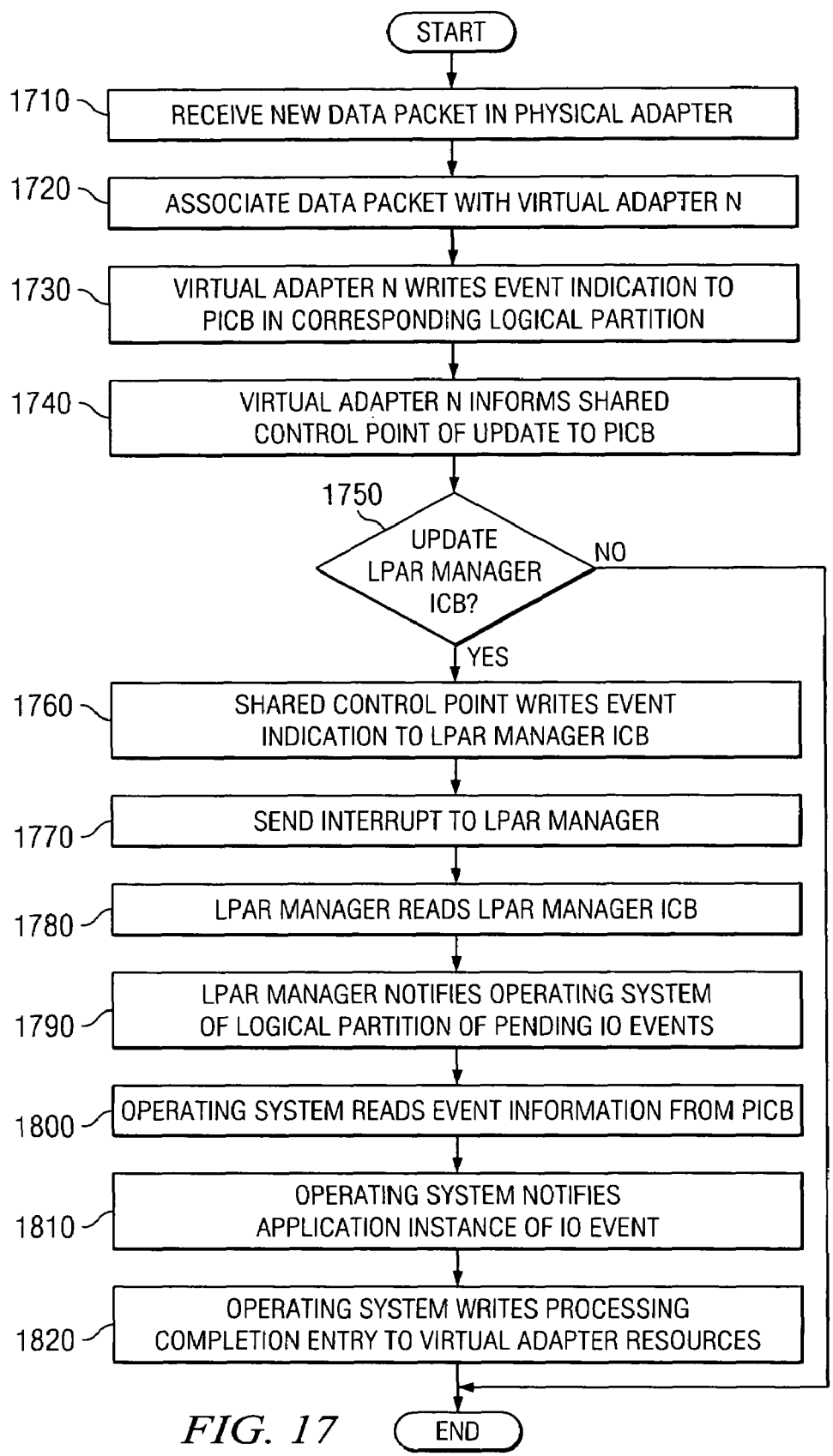
FIG. 17 is a flowchart outlining an exemplary operation of the present invention with regard to event notifications being sent by a virtual adapter to a host system in accordance with one exemplary embodiment of the present invention.

The PICB may be implemented as having a similar structure to the ICB described in FIGS. 17 and 18 of U.S. Patent Application Publication No. 2004/0054822. That is, the PICB may be a data structure that has a header portion and a payload portion. The header portion may comprise a status word including a PICB index identifying the PICB, an interrupts valid count indicating the number of interrupts in the payload portion of the PICB, and a time stamp. The remainder of the PICB is devoted to the payload portion which may comprise a plurality of fields for identifying event information, e.g., the identity of a channel that reported the event.

As mentioned above, in one exemplary embodiment of the present invention, event notifications or interrupts may be coalesced in a virtual adapter buffer and then transferred into a PICB in the operating system memory space once a predetermined condition is met. Alternatively, each event notification or interrupt may be directly written into the PICB without buffering in the virtual adapter. In either case, the transfer of the event notifications or interrupts may be performed, for example, using a Direct Memory Access (DMA) operation.

Figure 16:
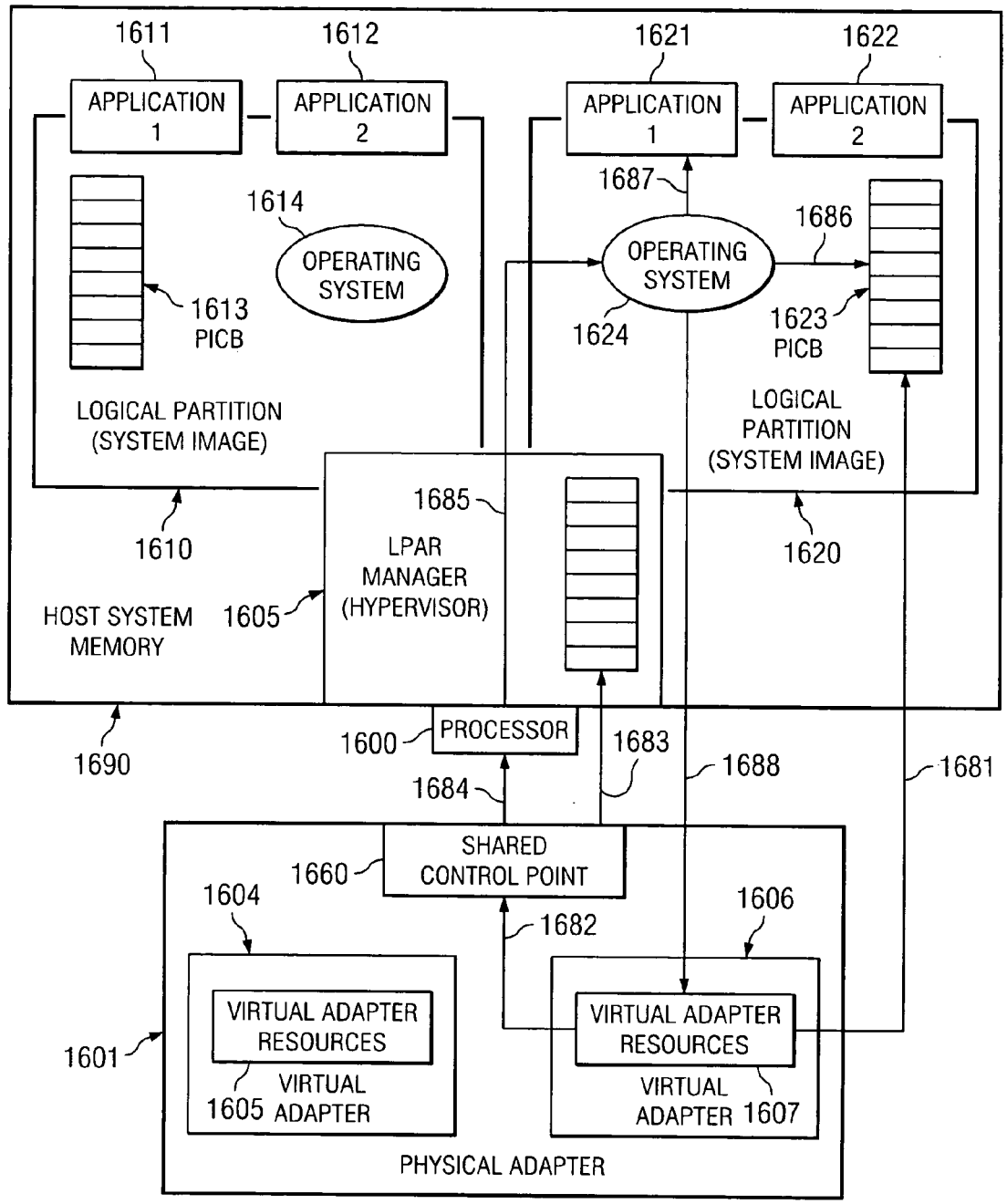
FIG. 16 is an exemplary diagram for illustrating the operation of the present invention when sending interrupts to a host system in which logical partitioning or virtualization is present.

FIG. 16 is an exemplary diagram for illustrating the operation of the present invention when sending interrupts to a host system in which logical partitioning or virtualization is present. As shown in FIG. 16, a physical adapter 1601 includes virtual adapters 1604 and 1606 configured in the manner described above with regard to FIG. 7. The virtual adapters 1604 and 1606 in turn have allocated virtual adapter resources 1605 and 1607. The LPAR manager 1695 associates virtual adapters 1604 and 1606 with respective ones of logical partitions or system images 1610 and 1620 in host system memory 1600.

The host system memory 1690 includes a first logical partition or system image 1610 and a second logical partition or system image 1620. While only two system images are illustrated, it should be appreciated that additional system images or partitions may be used without departing from the spirit and scope of the present invention. Each system image or logical partition 1610 and 1620 includes an operating system 1614 and 1624 as well as a PICB data structure 1613 and 1623. The system images 1610 and 1620 are further associated with application instances 1611, 1612, 1621 and 1622, respectively, such that the application instances communicate with the virtual adapters 1604 and 1606 via the system images 1610 and 1620.

Each system image or logical partition is allowed to only communicate with the virtual adapters that were associated with that system image by LPAR manager 1695. Thus, for example, system image 1610 is allowed to directly communicate with virtual adapter 1604 and virtual adapter resources 1605. System image 1620 is not allowed to directly communicate with virtual adapter 1604 or virtual adapter resources 1605. Similarly, system image 1620 is allowed to directly communicate with virtual adapter 1606 and virtual adapter resources 1607, and is not allowed to directly communicate with virtual adapter 1604 and virtual adapter resources 1605.

The virtual adapters 1604 and 1606 write event information or interrupts into the memory space used for a corresponding PICB by a write operation on an IO bus (not shown). For example, the virtual adapter resources 1607 of virtual adapter 1606 may write event information or an interrupt to the PICB 1623 using a write operation 1681. As mentioned above, this write operation 1681 may be a DMA operation that is performed after coalescing event information or interrupts in a buffer of the virtual adapter or may be a write operation 1681 that is performed with each event notification or interrupt generated in the virtual adapter 1606.

The association of the virtual adapter 1606 with a logical partition or system image 1620 is performed by the LPAR manager 1695, which as mentioned above may be a Hypervisor or other type of management software/hardware. The LPAR manager 1695 may associate the virtual adapter 1606 with the logical partition or system image 1620 using a unique bus address space per virtual adapter. The bus address space may be assigned to a virtual adapter when the virtual adapter is defined and initiated by the LPAR manager 1695.

Alternatively, each virtual adapter may use a PCI-Express bus, device or function. The bus, device or function may be used by an IO hub to extract the physical address into which the PICB is to be written. Use of Bus Number, Device Number and Function Number to identify a virtual adapter is explained above with reference to FIG. 14.

Having written an entry to the PICB identifying the event information or interrupt generated in the virtual adapter 1606, the virtual adapter 1606 reports to an IO adapter shared control point 1660 the writing of the PICB entry (1682). The shared control point 1660 is a software/hardware element in the physical adapter 1601 that gathers information of PICB updates from all of the virtual adapters 1604, 1606 on the physical adapter 1601 with which it is associated. There is a single shared control point 1660 per physical adapter 1601.

The shared control point 1660 has logic for coalescing one or more PICB updates into a single notification to the LPAR manager 1695. The notification is performed by the shared control point 1660 of the physical adapter 1601 writing a LPAR manager interrupt control block 1661 entry in a LPAR manager memory space identifying the updates to the PICBs in the logical partitions or system images 1610 and 1620 (1683). In one exemplary embodiment, the LPAR manager 1695 is a Hypervisor running on processor 1600 and the LPAR manager interrupt control block 1661 is referred to as a Hypervisor Interrupt Control Block (HICB).

Optionally, with the writing of the entry to the HICB 1661 an interrupt may be sent to the LPAR manager 1695 running on the processor 1600 (1684). The interrupt can be sent by either asserting an interrupt line, by sending a MSI, or any other interrupting mechanism. The interrupt may be asserted to the LPAR manager 1695 to inform the LPAR manager 1695 of one or more updates of the LPAR manager ICB or HICB 1661. That is, the interrupt may be sent with each update of a LPAR manager ICB or when updates to the LPAR manager ICB have met a predetermined criteria, e.g., a predetermined number of updates to the LPAR manager ICB, a predetermined time having elapsed since a last interrupt was sent to the LPAR manager, or the like.

The virtual adapter 1604, 1606 may control the pace of event/interrupt notification to the LPAR manager 1695 based on a number of different criteria. For example, event/interrupt notification to the LPAR manager 1695 may be based on minimal time between notifications (interrupts) on the update of the LPAR manager ICB or HICB 1661. Alternatively, event/interrupt notification to the LPAR manager 1695 may be based on maximal delay time to report a single LPAR manager ICB or HICB 1661 update. Still further, event/interrupt notification to the LPAR manager 1695 may be based on a maximal number of LPAR ICB or HICB 1661 updates without notification to the LPAR manager 1695. Other coalescing schemes based on time and numbers of events are also possible with the present invention and are intended to be within the spirit and scope of the present description.

The writing of entries to the LPAR manager ICB or HICB 1661 by the physical adapter 1601 may be performed in a number of different ways. In one exemplary embodiment, a unique bus address space may be assigned to the physical adapter 1601 with the LPAR manager 1695 being responsible for defining and initiating this unique bus address space when initializing the physical adapter 1601. Alternatively, in another exemplary embodiment, the physical adapter 1601 may use a unique PCI-Express bus, device or function which is used by an IO hub to extract the physical address into which the LPAR manager ICB or HICB 1661 is to be written.

The entries in the LPAR manager ICB or HICB 1661 may include references to the operating system 1614, 1624 in the logical partition or system image 1610, 1620 whose PICB was updated. These references permit the LPAR manager 1695 to notify the operating system 1614, 1624 of the update to the PICB associated with its logical partition or system image 1610, 1620 (1685).

Following the indication from the LPAR manager 1695 indicating the change to the PICB 1623, the operating system 1624 reads the PICB 1623 from the system memory 1690 (1686). Based on the contents of the PICB, the operating system 1624 informs an appropriate application 1621 about the event reported by the virtual adapter 1606 (1687). This informing of the appropriate application 1621 may include invoking an event handler to handle the event information/interrupt identified in the PICB 1623.

Once the PICB 1623 entries are processed in this manner, the operating system 1624 notifies the virtual adapter 1606 of the completion of processing of the PICB 1623. This may be done by an IO write operation (1688) that writes a completion entry to a memory space associated with the virtual adapter 1606. In this way, event information and/or interrupts may be reported to an appropriate logical partition or system image in a host system from a virtual adapter operating on a physical adapter of the host system.

The present invention permits a PICB to hold indications of events, e.g., interrupts, related to one or more applications associated with a logical partition or system image. The LPAR manager ICB or HICB may be used to hold indications of updates to one or more PICBs. Thus, event notifications or interrupts may be coalesced in a PICB while updates to one or more PICBs may be coalesced in the LPAR ICB or HICB. The physical adapter may assert an interrupt to the LPAR manager in response to an update of an HICB or more than one update to the HICB.

FIG. 17 is a flowchart outlining an exemplary operation of the present invention with regard to event notifications being sent by a virtual adapter to a host system in accordance with one exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 17, the operation starts with the arrival of a new data packet in the physical adapter (step 1710). This new data packet may be received either from the host system associated with the physical adapter or from an external data processing system via a network connection, for example. The data packet is associated with a virtual adapter N (step 1720). This association of the data packet to the virtual adapter may be performed based on information contained in the data packet header identifying the application instance to/from which the data packet is associated. Since the logical partition/system image associated with an application instance is also associated with a particular virtual adapter, the physical adapter is able to discern which virtual adapter is to be associated with the data packet.

The virtual adapter N writes an event indication to a PICB entry in the logical partition/system image memory space associated with the logical partition/system image associated with the virtual adapter N (step 1730). This step corresponds to element 1681 in FIG. 16, for example. The virtual adapter then informs the shared control point in the physical adapter that a new event entry has been added to the PICB (step 1740). Alternatively, as mentioned above, the virtual adapter may coalesce updates to the PICB and transmit them in bulk to the PICB.

A determination is made as to whether the LPAR manager ICB is to be updated (step 1750). This determination may be made based on whether certain criteria are met, e.g., a predetermined number of updates to a PICB, a predetermined number of updates to a plurality of PICBs, a predetermined elapsed time since a last update of the LPAR manager ICB, or the like. If it is determined that the LPAR manager ICB is not to be updated yet, the operation ends but may be repeated with the next arrival of a data packet. If, however, it is determine that the LPAR manager ICB is to be updated, an event indication is written to the LPAR manager ICB in the LPAR manager memory space identifying the updates to the PICBs managed by the LPAR manager (step 1760). Optionally, an interrupt may be generated and sent to the LPAR manager informing the LPAR manager of the update to the LPAR manager ICB (step 1770).

The LPAR manager then reads the LPAR manager ICB (step 1780) and notifies the related operating systems that there are pending IO events (step 1790). The operating systems then read the event information from their respective PICBs (step 1800) and notify the appropriate application instances of the events (step 1810). The operating system then writes an indication of the completion of processing of the PICB to the virtual adapter resources of the virtual adapter associated with the logical partition/system image associated with the operating system (step 1820). The operation then terminates.

Thus, the present invention provides a mechanism for reporting event notifications/interrupts to application instances in a logically partitioned host system having virtualized IO adapters. With the present invention, event notifications/interrupts may be coalesced in the virtual adapter or the PICB of the logical partition/system image before being processed by the operating system and corresponding application instances. A LPAR manager ICB or HICB may be used to coalesce PICB updates over one or more logical partitions/system images.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a logically partitioned data processing system, for processing event notifications, the method comprising the steps, performed by an input/output (IO) adapter, of:
   detecting an event for which an application is to be notified;
   identifying a logical partition, from a plurality of logical partitions, associated with the event;
   updating a partition interrupt control block in a memory space within the identified logical partition to identify event information associated with the event, wherein the updating step writes an event notification associated with the event to the partition interrupt control block; and
   informing an operating system associated with the identified logical partition of the update to the partition interrupt control block.

2. The method of claim 1, wherein informing the operating system associated with the identified logical partition of the update to the partition interrupt control block includes:
   writing an entry to a logical partition manager interrupt control block associated with a logical partition manager, wherein the entry identifies the update to the partition intermpt control lock; and
   wherein the logical partition manager sends a notification to the operating system associated with the identified logical partition identifying the update to the partition interrupt control block.

3. The method of claim 1, wherein the IO adapter is a virtual adapter associated with a physical IO adapter.

4. The method of claim 2, further comprising:
   sending a partition interrupt control block update notification to the shared control point logic on the IO adapter to provide notification of the update to the partition interrupt control block, wherein the shared control point logic writes the partition interrupt control block update notification to the logical partition manager interrupt control block associated with the logical partition manager.

5. The method of claim 4, further comprising:
   coalescing the partition interrupt control block update notification with other partition interrupt control block update notifications; and
   sending an interrupt from the shared control point logic to the logical partition manager informing the logical partition manager of the coalesced partition interrupt control block update notifications when a predetermined criteria associated with the coalescing is met.

6. The method of claim 3, wherein logical partition manager associates the virtual adapter with a logical partition of the data processing such that the virtual adapter may communicate only with the associated logical partition.

7. The method of claim 6, wherein the logical partition manager associates the virtual adapter with a logical partition based on at least one of a unique bus address space per virtual adapter, a bus number, a device number, and a function number.

8. The method of claim 1, further comprising:
   coalescing a plurality of event notifications in a buffer of the IO adapter; and
   determining whether a predetermined criteria associated with the coalescing step has been met, wherein writing the coalesced event notification to the partition interrupt control block is performed after the predetermined criteria is met.

9. The method of claim 2, further comprising:
   determining if a predetermined criteria is satisfied by the writing of the entry to the logical partition manager interrupt control block; and
   sending an interrupt to the logical partition manager in response to the predetermined criteria being met.

10. The method of claim 9, wherein the predetermined criteria includes at least one of a predetermined number of entries being written to a logical partition manager interrupt control block data structure and a predetermined time having elapsed since a last interrupt having been sent to the logical partition manager.

11. A computer program product in a computer readable storage-type medium for processing event notifications in a logically partitioned data processing system, the computer program product comprising instructions, performed by an input/output (IO) adapter of:
   first instructions for detecting an event for which an application is to be notified;
   second instructions for identifying a logical partition, from a plurality of logical partitions, associated with the event;
   third instructions for updating a partition interrupt control block in a memory space within the identified logical partition to identify event information associated with the event, wherein the third instructions writes an event notification associated with the event to the partition interrupt control block; and
   fourth instructions for informing an operating system associated with the identified logical partition of the update to the partition interrupt control block.

12. The computer program product of claim 11, wherein the fourth instructions for informing the operating system associated with the identified logical partition of the update to the partition interrupt control block include:
   instructions for writing an entry to a logical partition manager interrupt control block associated with a logical partition manager, wherein the entry identifies the update to the partition interrupt control block; and
   wherein the logical partition manager sends a notification to the operating system associated with the identified logical partition identifying the update to the partition interrupt control block.

13. The computer program product of claim 11, the IO adapter is a virtual adapter associated with a physical IO adapter.

14. The computer program product of claim 12, further comprising:
   instructions for sending a partition interrupt control block update notification to the shared control point logic on the IO adapter to provide notification of the update to the partition interrupt control block, wherein the shared control point logic writes the partition interrupt control block update notification to the logical partition manager interrupt control block associated with, the logical partition manager.

15. The computer program product of claim 14, further comprising:
   instructions for coalescing the partition interrupt control block update notification with other partition interrupt control block update notifications; and
   instructions for sending an interrupt from the shared control point logic to the logical partition manager informing the logical partition manager of the coalesced partition interrupt control block update notifications when a predetermined criteria associated with the coalescing is met.

16. The computer program product of claim 13, wherein the logical partition manager associates the virtual adapter with a logical partition of the data processing system such that the virtual adapter may communicate only with the associated logical partition.

17. The computer program product of claim 16, wherein the logical partition manager associates the virtual adapter with a logical partition based on at least one of a unique bus address space per virtual adapter, a bus number, a device number, and a function number.

18. The computer program product of claim 11, further comprising:
   fifth instructions for coalescing a plurality of event notifications in a buffer of the IO adapter; and
   sixth instructions for determining whether a predetermined criteria associated with the coalescing step has been met, wherein the third instructions for updating a partition interrupt control block is performed after the predetermined criteria is met.

19. The computer program product of claim 12, further comprising:
   fifth instructions for determining if a predetermined criteria is satisfied by the writing of the entry to the logical partition manager interrupt control block; and
   sixth instructions for sending an interrupt to the logical partition manager in response to the predetermined criteria being met.

20. The computer program product of claim 19, wherein the predetermined criteria includes at least one of a predetermined number of entries being written to a logical partition manager interrupt control block data structure and a predetermined time having elapsed since a last interrupt having been sent to the logical partition manager.

21. A system for processing event notifications in a logically partitioned data processing system, comprising:
   an IO adapter having at least one virtual adapter running on the IO adapter; and
   a logically partitioned data processing system having a logical partition manager and a partition interrupt control block associated with a logical partition of the logically partitioned data processing system, wherein the virtual adapter detects an event for which an application is to be notified, identifies a logical partition associated with the event, writes an event notification associated with the event to the partition interrupt control block within the identified logical partition to identify event information associated with the event, and informs an operating system associated with the identified logical partition of the update to the partition interrupt control block.

* * * * *